(12) United States Patent
Sato et al.

(10) Patent No.: US 7,200,349 B2
(45) Date of Patent: Apr. 3, 2007

(54) PARTS, AND PART SUPPLYING METHODS

(75) Inventors: Minoru Sato, Shizuoka (JP); Yoshiyuki Batori, Shizuoka (JP); Takeshi Arimitsu, Kanagawa (JP); Masanari Morioka, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 10/718,790

(22) Filed: Nov. 24, 2003

(65) Prior Publication Data

US 2004/0117971 A1 Jun. 24, 2004

(30) Foreign Application Priority Data

Nov. 29, 2002 (JP) ............................. 2002-346635

(51) Int. Cl.
*G03G 21/16* (2006.01)
(52) U.S. Cl. .................................. 399/111; 414/198.4
(58) Field of Classification Search ................ 399/107, 399/109, 111, 411; 29/430, 464; 198/463.1, 198/464; 206/504; 414/27, 798.2, 798.4
See application file for complete search history.

(56) References Cited

U.S. PATENT DOCUMENTS

| | | | |
|---|---|---|---|
| 4,972,569 A * | 11/1990 | Aoki et al. .................... 29/429 |
| 5,331,373 A | 7/1994 | Nomura et al. ............. 355/200 |
| 5,452,056 A | 9/1995 | Nomura et al. ............. 355/200 |
| 5,528,341 A | 6/1996 | Shishido et al. ............ 355/200 |
| 5,585,889 A | 12/1996 | Shishido et al. ............ 355/200 |
| 5,638,161 A | 6/1997 | Numagami et al. ......... 399/111 |
| 5,644,473 A * | 7/1997 | Derouiche ................... 361/732 |
| 5,870,654 A | 2/1999 | Sato et al. ................... 399/109 |
| 5,911,096 A | 6/1999 | Batori et al. ................ 399/111 |
| 5,920,753 A | 7/1999 | Sasaki et al. ............... 399/111 |
| 5,930,562 A | 7/1999 | Noda et al. ................. 399/114 |
| 5,937,237 A | 8/1999 | Nonaka et al. ............. 399/106 |
| 5,940,658 A | 8/1999 | Yokoi et al. ................ 399/119 |
| 5,946,531 A | 8/1999 | Miura et al. ................ 399/111 |
| 5,966,566 A | 10/1999 | Odagawa et al. ........... 399/109 |
| 5,974,288 A | 10/1999 | Sato .......................... 399/119 |
| 6,002,896 A | 12/1999 | Miyamoto et al. .......... 399/114 |
| 6,055,406 A | 4/2000 | Kawai et al. ............... 399/360 |
| 6,061,538 A | 5/2000 | Arimitsu et al. ............ 399/111 |

(Continued)

FOREIGN PATENT DOCUMENTS

JP    SHO 53-92037    7/1978

(Continued)

*Primary Examiner*—Robert Beatty
(74) *Attorney, Agent, or Firm*—Fitzpatrick, Cella, Harper & Scinto

(57) ABSTRACT

A part is designed so that a plurality of parts each identical to the part are arranged in the same attitude in parallel with a part moving direction on a guide (40), and includes projections (10/5, 10/6) for pushing an abutment surface (10/7) provided on a preceding part placed on the guide, while maintaining the attitude of the preceding part, and an abutment surface (10/7) to be pushed by projections (10/5, 10/6) provided on a succeeding part placed on the guide. The projections and the abutment surface are provided in an area of the part, which area is selected to avoid an area required to have dimensional precision whereby it is possible to supply the part to an assembly process without causing damage to the area required to have dimensional precision.

11 Claims, 32 Drawing Sheets

U.S. PATENT DOCUMENTS

| | | | |
|---|---|---|---|
| 6,075,957 A | 6/2000 | Batori et al. | 399/114 |
| 6,094,793 A * | 8/2000 | Szuba | 29/33 P |
| 6,101,348 A | 8/2000 | Nonaka et al. | 399/103 |
| 6,104,894 A | 8/2000 | Sato et al. | 399/106 |
| 6,131,007 A | 10/2000 | Yamaguchi et al. | 399/256 |
| 6,141,514 A * | 10/2000 | Inaba et al. | 399/109 |
| 6,185,390 B1 | 2/2001 | Higeta et al. | 399/90 |
| 6,188,856 B1 | 2/2001 | Sato | 399/119 |
| 6,275,668 B1 | 8/2001 | Batori | 399/90 |
| 6,279,220 B1 * | 8/2001 | Esaki | 29/430 |
| 6,282,390 B1 | 8/2001 | Miyabe et al. | 399/111 |
| 6,334,035 B1 | 12/2001 | Abe et al. | 399/106 |
| 6,351,620 B1 | 2/2002 | Miyabe et al. | 399/111 |
| 6,363,226 B1 | 3/2002 | Batori | 399/8 |
| 6,381,420 B1 | 4/2002 | Sato et al. | 399/27 |
| 6,459,869 B2 | 10/2002 | Nittani et al. | 399/111 |
| 6,463,234 B2 | 10/2002 | Arimitsu et al. | 399/113 |
| 6,640,066 B2 | 10/2003 | Sato | 399/106 |
| 2002/0110388 A1 | 8/2002 | Yokomori et al. | 399/167 |
| 2002/0122672 A1 | 9/2002 | Sasago et al. | 399/12 |
| 2002/0131790 A1 | 9/2002 | Sato et al. | 399/111 |
| 2002/0161654 A1 | 10/2002 | Uetake et al. | 705/22 |
| 2003/0002883 A1 | 1/2003 | Sato et al. | 399/102 |
| 2003/0086715 A1 | 5/2003 | Miura et al. | 399/27 |
| 2003/0156856 A1 | 8/2003 | Arimitsu et al. | 399/114 |
| 2003/0185587 A1 | 10/2003 | Kawai et al. | 399/111 |
| 2004/0117970 A1 * | 6/2004 | Ogino et al. | 29/464 |

FOREIGN PATENT DOCUMENTS

| | | |
|---|---|---|
| JP | 05-037184 | 2/1993 |
| JP | 06-130877 | 5/1994 |
| JP | 07196162 A * | 8/1995 |
| JP | 11224042 A * | 8/1999 |

* cited by examiner

PARTS, AND PART SUPPLYING METHODS

BACKGROUND OF THE INVENTION

1. Field of the Invention

The present invention relates to parts and part supplying methods. The term "part(s)" used herein means a part(s) which constitutes, for example, a process cartridge required to have dimensional precision and removably fitted into a main body of an electrophotographic image forming apparatus.

2. Description of the Related Art

An image forming apparatus such as a printer using electrophotographic techniques forms a latent image on a uniformly charged photosensitive drum (or electrophotographic photosensitive member) by selective exposure, develops this latent image by toner, and transfers a toner image to a recording medium, thereby effecting recording of an image.

Such an apparatus makes use of a cartridge in which the photosensitive drum, a charger, a developer, a cleaning member and the like are assembled into an integral structure. Accordingly, a user can supply toner or replace a photosensitive drum part which has reached its lifetime, merely by loading a new cartridge into the main body of the apparatus in place of an old cartridge, whereby the user can easily perform maintenance.

The housing of the above-described cartridge is constructed by connecting together a plurality of frames such as a developing frame for supporting the developer and a cleaning frame for supporting the cleaning member.

Many of the cartridge parts necessary for the assembly of the cartridge are classified by the kinds of parts and are randomly boxed in a production factory, or to avoid damage to parts due to contact therebetween, the cartridge parts are individually placed into separate containers and are boxed. Such cartridge parts are conveyed to an assembly line. In the case where the cartridge parts are supplied to an automatic cartridge assembly machine, a device (a parts feeder) is used to make uniform the direction of arrangement of the cartridge parts or the positional relationship between the obverse and reverse side of each of the cartridge parts.

SUMMARY OF THE INVENTION

An object of the invention is to provide an arrangement for easily and reliably supplying parts to an assembly process without causing damage to the areas of the parts that are required to have dimensional precision, the parts being used in an assembly process for products each made of a plurality of parts, for example, an assembly process for process cartridges.

Another object of the invention is to provide an arrangement capable of moving a part in a part arranging direction without changing the attitude of the part.

Another object of the invention is to provide an arrangement for supplying parts to an assembly process without causing damage to the areas of the parts that are required to have dimensional precision, the parts being used in an assembly process for products each made of a plurality of parts, for example, an assembly process for process cartridges.

Another object of the invention is to provide a part which is designed so that a plurality of parts each identical to the part are arranged in the same attitude in parallel with a part moving direction on a guide for supplying the part to a predetermined position. The part includes:

a plurality of abutment portions for pushing a plurality of receiving portions provided on a preceding part placed on the guide, while maintaining an attitude of the preceding part; and a plurality of receiving portions to be pushed by a plurality of projections provided on a succeeding part placed on the guide, the abutment portions and the receiving portions being provided in an area of the part, which area is selected to avoid an area required to have dimensional precision.

Another object of the invention is to provide a part supplying method for supplying a part to a predetermined position, which method includes:

a step of placing a part on a guide in the same attitude as a preceding part on the guide; and a step of moving the preceding part on the guide by pushing a plurality of receiving portions provided on the preceding part placed on the guide, in such a manner that an attitude of the preceding part is maintained, by means of a plurality of abutment portions provided on the placed part.

DESCRIPTION OF THE PREFERRED EMBODIMENTS

A preferred embodiment of this invention will be described below in illustrative detail with reference to the accompanying drawings. In the following description, unless otherwise specified, the dimensions, materials, shapes and relative positions and the like of constituent parts of the embodiment to be described below are shown by way of illustration only, and are not intended to restrict the scope of the invention. In addition, the materials, shapes and the like of members which will be described later in order are assumed to be the same throughout the entire description, unless otherwise specified.

In the following description, the longitudinal direction of a process cartridge is a direction which intersects (approximately perpendicularly) the direction in which the process cartridge is to be removably loaded into a main body of an image forming apparatus (the axial direction of an image bearing member), is parallel with a surface of a recording medium and intersects (approximately perpendicularly) the transporting direction of the recording medium. The terms "right" and "left" used herein represent the right side and the left side of the recording medium which is viewed from the top side thereof in the transporting direction of the recording medium. The top surface of the process cartridge is a surface to be positioned on the top side during the state in which the process cartridge is loaded in the main body of the apparatus, while the bottom surface of the process cartridge is a surface to be positioned on the bottom side during that state.

(Description of Entire Construction of Electrophotographic Image Forming Apparatus)

Figure 1:
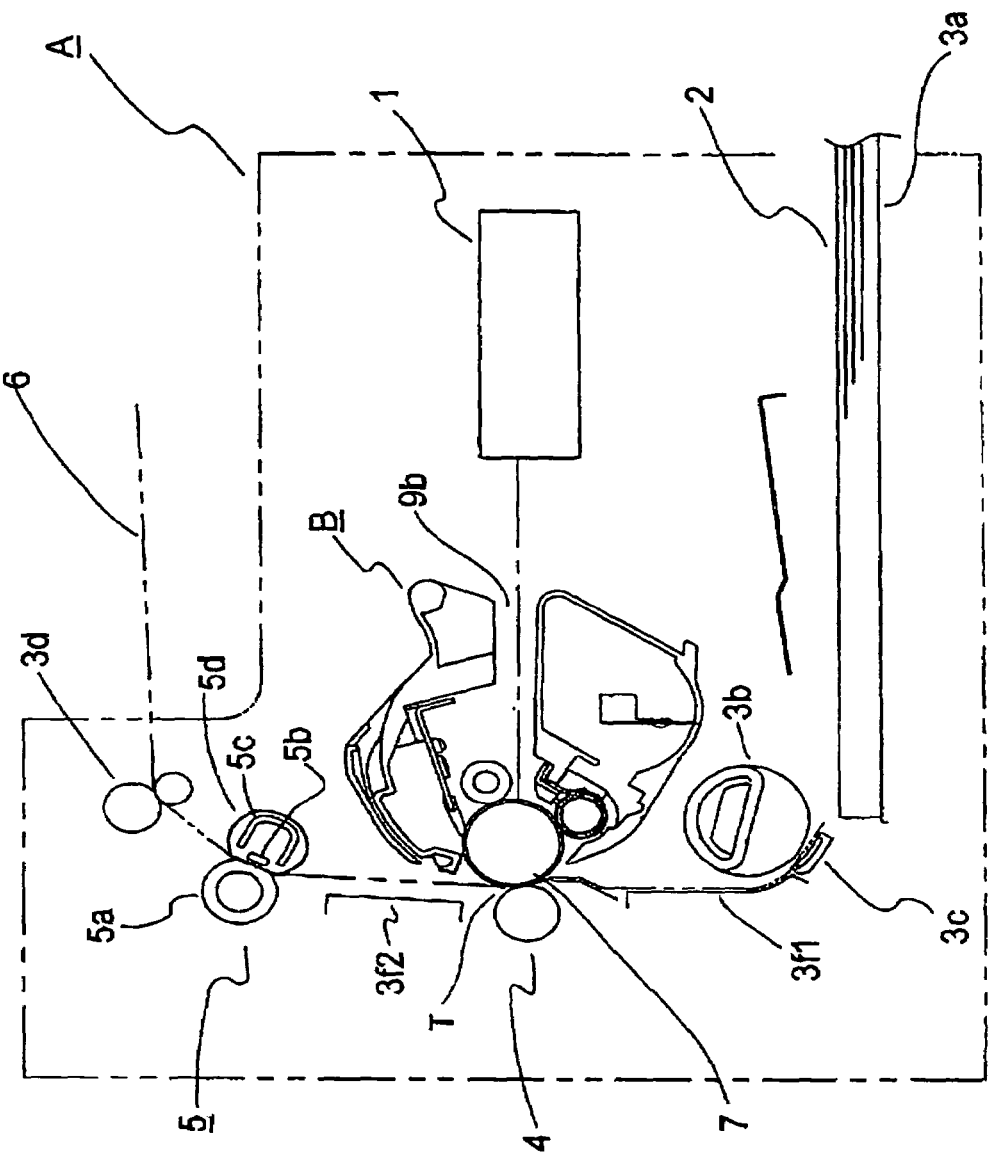
FIG. 1 is a schematic cross-sectional view of an electrophotographic image forming apparatus according to an embodiment of the invention.

First of all, the entire construction of an electrophotographic image forming apparatus (hereinafter referred to as the "image forming apparatus") will be schematically described below with reference to FIG. 1. FIG. 1 is a schematic cross-sectional view of the image forming apparatus in which a process cartridge according to this embodiment is mounted. More specifically, FIG. 1 is a schematic cross-sectional view of a laser beam printer which is one form of the image forming apparatus.

As shown in FIG. 1, an image forming apparatus (laser beam printer) A according to this embodiment irradiates information light based on image information from an optical system 1 serving as optical means onto a drum-shaped electrophotographic photosensitive member (or image bearing member, hereinafter referred to as the "photosensitive drum") 7, thereby forming an electrostatic latent image on the photosensitive drum 7. This electrostatic latent image is developed with a developer (hereafter referred to as "toner") to form a toner image. In synchronism with the formation of the toner image, recording media 2 (for example, recording paper, OHP sheets, and pieces of cloth) are fed from a cassette 3a on a sheet by sheet basis by means of a pickup roller 3b and a pressure member 3c which is in pressure contact with the pickup roller 3b.

One recording medium 2 fed in this manner is transported along a transport guide 3f1 to a transfer section T in which the photosensitive drum 7 incorporated in a process cartridge B and a transfer roller 4 serving as transfer means are opposed to each other.

The toner image formed on the photosensitive drum 7 is transferred to the recording medium 2 transported to the transfer section T, by the transfer roller 4 to which a voltage is applied, and the recording medium 2 is transported to fixing means 5 along a transport guide 3f2.

The fixing means 5 includes a driving roller 5a and a fixing rotary body 5d constructed with a cylindrical sheet which contains a heater 5b and is rotatably supported by a support 5c, and applies heat and pressure to the recording medium 2 which is passing through the fixing means 5, thereby fixing the transferred toner image.

A discharge roller 3d transports the recording medium 2 having the fixed toner image, and discharges the recording medium 2 to a discharge section 6 through a reverse transport path. Incidentally, in this embodiment, transport means 3 is constructed of the pickup roller 3b, the pressure member 3c, the discharge roller 3d, and the like.

(Process Cartridge)

Figure 2:
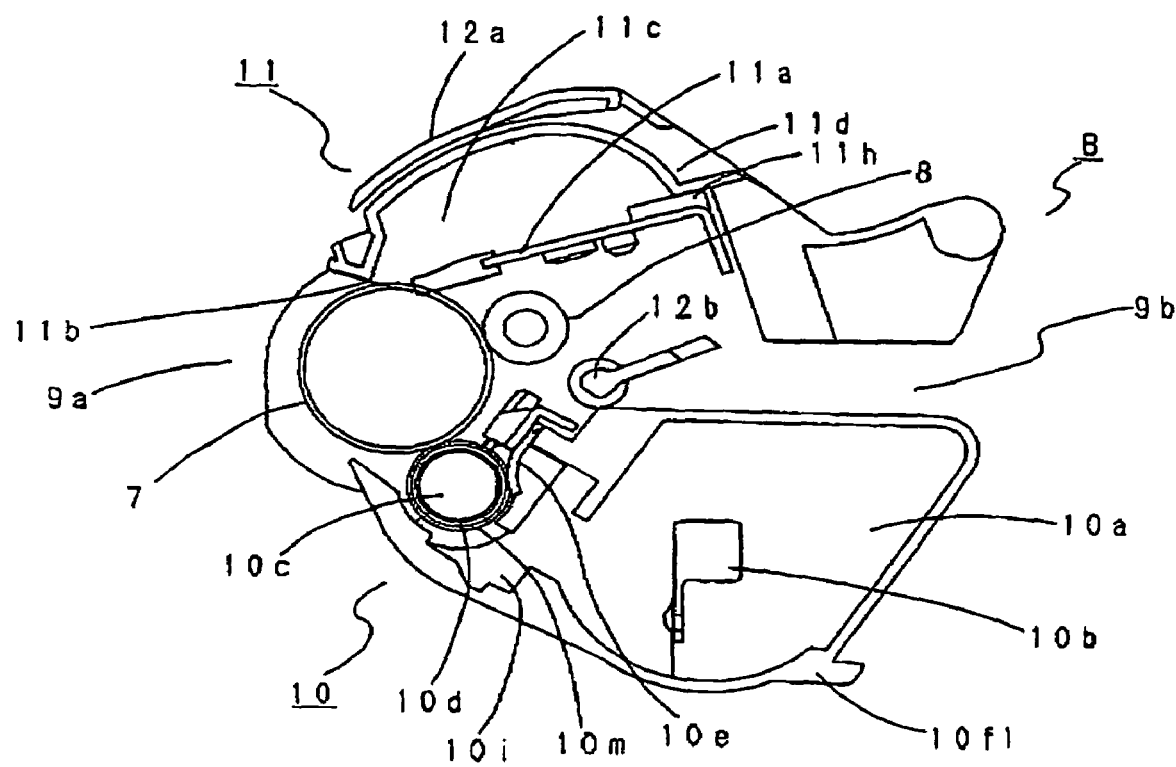
FIG. 2 is a schematic cross-sectional view of a process cartridge according to the embodiment of the invention.

The entire construction of the process cartridge B will be schematically described below with reference to FIG. 2. FIG. 2 is a schematic cross-sectional view of the process cartridge B according to this embodiment.

As shown in FIG. 2, the process cartridge B is provided with the photosensitive drum and at least one process means.

The process means includes, for example, charging means for electrically charging the photosensitive drum, developing means for developing an electrostatic latent image formed on the photosensitive drum, and cleaning means for cleaning toner remaining on the photosensitive drum.

In this embodiment, while the photosensitive drum 7 having a photosensitive layer is being rotated, a voltage is applied to a charging roller 8 which serves as charging means, to uniformly charge the surface of the photosensitive drum 7. Then, this electrically charged photosensitive drum 7 is exposed to information light (a light image) based on image information sent from the optical system 1, through an exposure opening 9b. In this manner, an electrostatic latent image is formed on the surface of the photosensitive drum 7, and the electrostatic latent image is developed by a developing unit 10.

The developing unit 10 sends out toner contained in a toner chamber 10a which serves as a toner accommodating portion, by means of a rotatable toner feeding member 10b. Then, while a developing roller 10d which is a developing rotary body (or developer bearing member) containing a stationary magnet 10c is being rotated, a toner layer to which frictionally electrified charge has been given by a developing blade 10e is formed on the surface of the developing roller 10d. Then, this toner is transferred to the photosensitive drum 7 according to the electrostatic latent image. In this manner, a toner image is formed on the photosensitive drum 7 as a visible image.

Then, a voltage which is of opposite polarity to the polarity of the toner image is applied to the transfer roller 4 to transfer the toner image to the recording medium 2. After that, the toner remaining on the photosensitive drum 7 is scraped down by a cleaning blade 11a. Then, the scraped toner is scooped by a scooping sheet 11b, and is collected into a removed toner accommodating portion 11c. The residual toner on the photosensitive drum 7 is removed by this cleaning means.

The process cartridge B according to this embodiment includes a cleaning unit 11 which rotatably supports the photosensitive drum 7 and is made of a cleaning frame 11d in which the cleaning blade 11a and the charging roller 8 are incorporated, and the developing unit 10 made of a toner developing frame 10f1 in which the developing roller 10d and the toner chamber 10a are incorporated. The frame 10f1 is supported for turning movement with respect to the frame 11d so that the developing roller 10d can be disposed in parallel opposed relation to the photosensitive drum 7 with a predetermined space interposed therebetween. Spacers 10m which retain the space between the developing roller 10d and the photosensitive drum 7 are respectively disposed at both ends of the developing roller 10d.

End members 10g (refer to FIG. 7) are respectively provided at both ends of the frame 10f1. Each of the end members 10g has an arm portion 10g7 provided with a connecting hole 10g8 for rotatably suspending the developing unit 10 containing the developing roller 10d from the cleaning unit 11 containing the cleaning blade 11a. A predetermined pressurizing force for retaining a space is applied between the developing unit 10 and the cleaning unit 11.

(Cleaning Unit)

Figure 3:
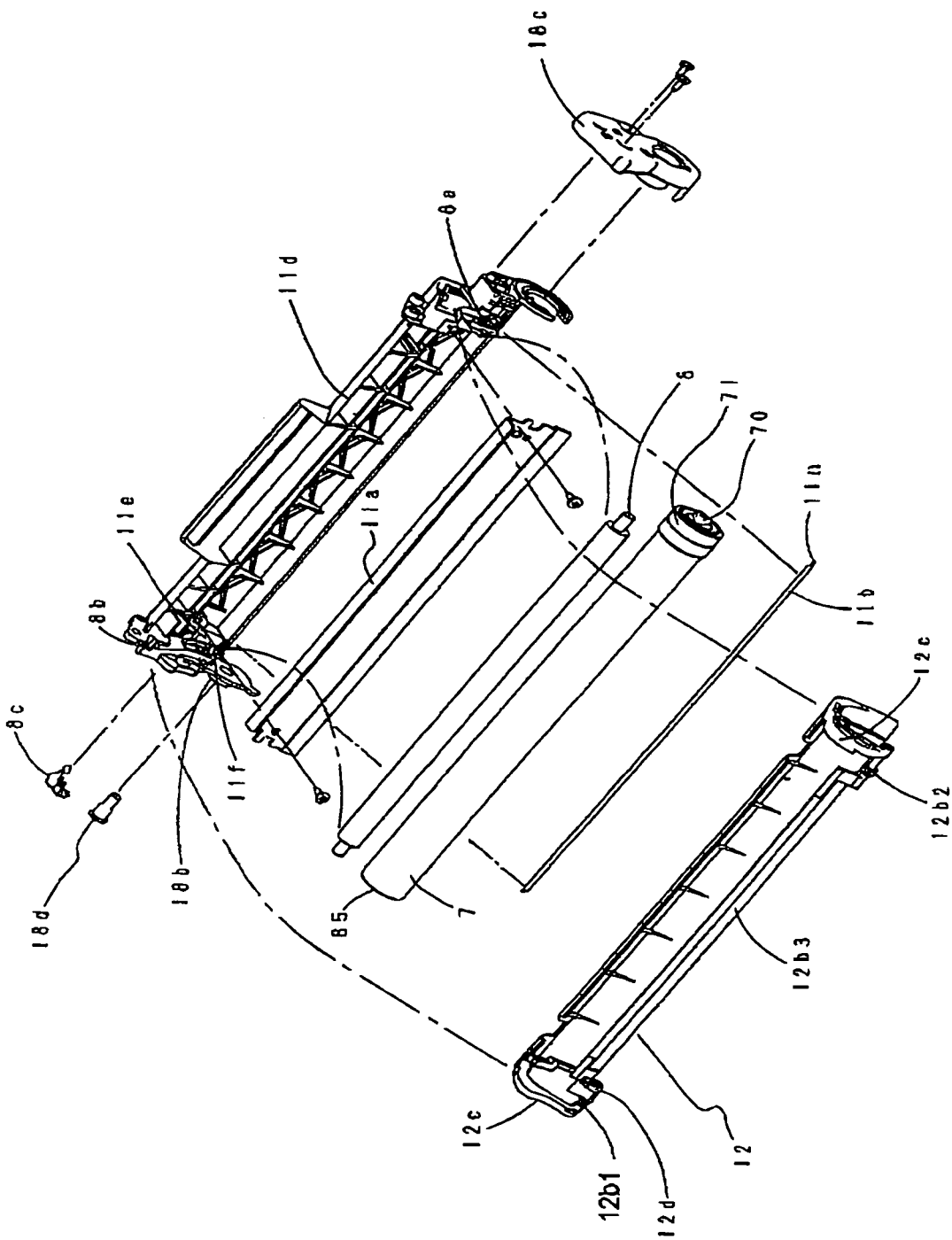
FIG. 3 is a perspective view of a cleaning unit assembly according to the embodiment of the invention.
Figure 4:
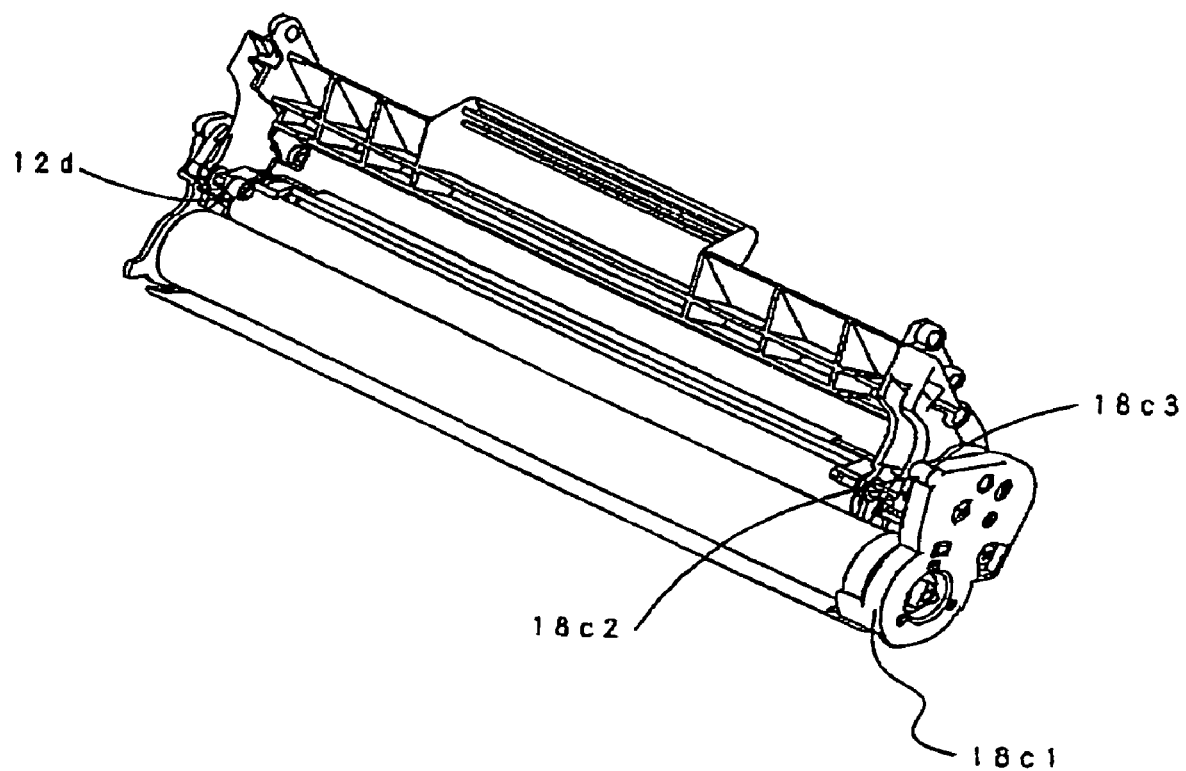
FIG. 4 is one general perspective view of the cleaning unit according to the embodiment of the invention.

The construction of the cleaning unit 11 which constitutes part of the process cartridge B will be described below in detail with reference to FIGS. 2 through 4. FIG. 3 is an assembling perspective view of the cleaning unit 11 according to this embodiment, and FIG. 4 is a general perspective view of the cleaning unit 11.

The cleaning unit 11 has the photosensitive drum 7, the charging roller 8 for electrically charging the surface of the photosensitive drum 7, the cleaning blade 11a for removing toner remaining on the surface of the photosensitive drum 7, the cleaning frame 11d to which the cleaning blade 11a is secured, a drum shutter 12 rotatably provided on the cleaning frame 11d, and a bearing member 18c for supporting the photosensitive drum 7.

A first seal member 11e is fixed to a predetermined position of the cleaning frame 11d by double sided adhesive tape or the like so that the toner accommodated in the removed toner accommodating portion 11c is prevented from leaking from the reverse side of both rubber ends of the cleaning blade 11a.

A second seal member 11h is fixed to a predetermined position of the cleaning frame 11d by double sided adhesive tape or the like so that the toner accommodated in the removed toner accommodating portion 11c is prevented from leaking from the reverse side of the cleaning blade 11a.

A third seal member 11f is fixed to a predetermined position of the cleaning frame 11d by double sided adhesive tape or the like so that the toner accommodated in the removed toner accommodating portion 11c is prevented from leaking from both rubber ends of the cleaning blade 11a, and as a member for cleaning sticking matter such as toner on the photosensitive drum 7.

The scooping sheet 11b which serves as a scooping member is fixed to the cleaning frame 11d by double sided adhesive tape 11n.

Roller bearings 8a and 8b into each of which either one of the opposite ends of the shaft portion of the charging roller 8 is to be fitted are respectively provided at both longitudinal ends of the cleaning frame 11d. In addition, an electrode 8c for supplying electricity to the charging roller 8 from the main body of the image forming apparatus A is provided on the cleaning frame 11d in the state of being kept in contact with the roller bearing 8b.

The photosensitive drum 7 is constructed as a unit in which a triangular coupling 70 serving as coupling means for transmitting driving and a drum gear assembly 71 in which a grounding contact and gears for transmitting driving to the developing roller 10d and the transfer roller 4 are connected to one end, while a flange 85 having a bearing is connected to the other end. The photosensitive drum 7 is supported by the bearing member 18c connected to the cleaning frame 11d on the side of the triangular coupling 70 by a machine screw and a positioning pin 18d which is press-fitted in a positioning portion 18b provided in the cleaning frame 11d.

The drum shutter 12 is capable of integrally covering the exposure opening 9b and a transfer opening 9a in which the photosensitive drum 7 is opposed to the transfer roller 4, and is rotatably provided on the cleaning frame 11d. The construction of the drum shutter 12 will be described below in detail.

A drum protecting portion 12a covers the transfer opening 9a in which the photosensitive drum 7 is opposed to the transfer roller 4. A rotating shaft 12b is provided on the cleaning frame 11d in the vicinity of the charging roller 8, and is provided with sliding portions 12b1 and 12b2 provided at both ends of the rotating shaft 12b for sliding movement relative to the cleaning frame 11d, and a shaft portion 12b3 which connects the sliding portions 12b1 and 12b2. Connecting portions 12c are respectively provided at two right and left locations so that both ends of the drum protecting portion 12a and the rotating shaft 12b are connected to one another at the outside of the rotating shaft 12b.

A shutter spring 12*d* gives an urging force to the drum shutter 12 by its springy force in the direction in which the drum shutter 12 covers the photosensitive drum 7. A rib 12*e* (refer to FIG. 5) is provided on the right connecting portion 12*c* at the outside of the rotating shaft 12*b*, and extends outwardly from the connecting portion 12*c* in the longitudinal direction of the drum shutter 12. This rib 12*e* is received by a shutter guide Gb9 (refer to FIG. 10) of a guide member Gb provided on the main body of the image forming apparatus A which will be described later, whereby the drum shutter 12 is retained in its open attitude.

Figure 5:
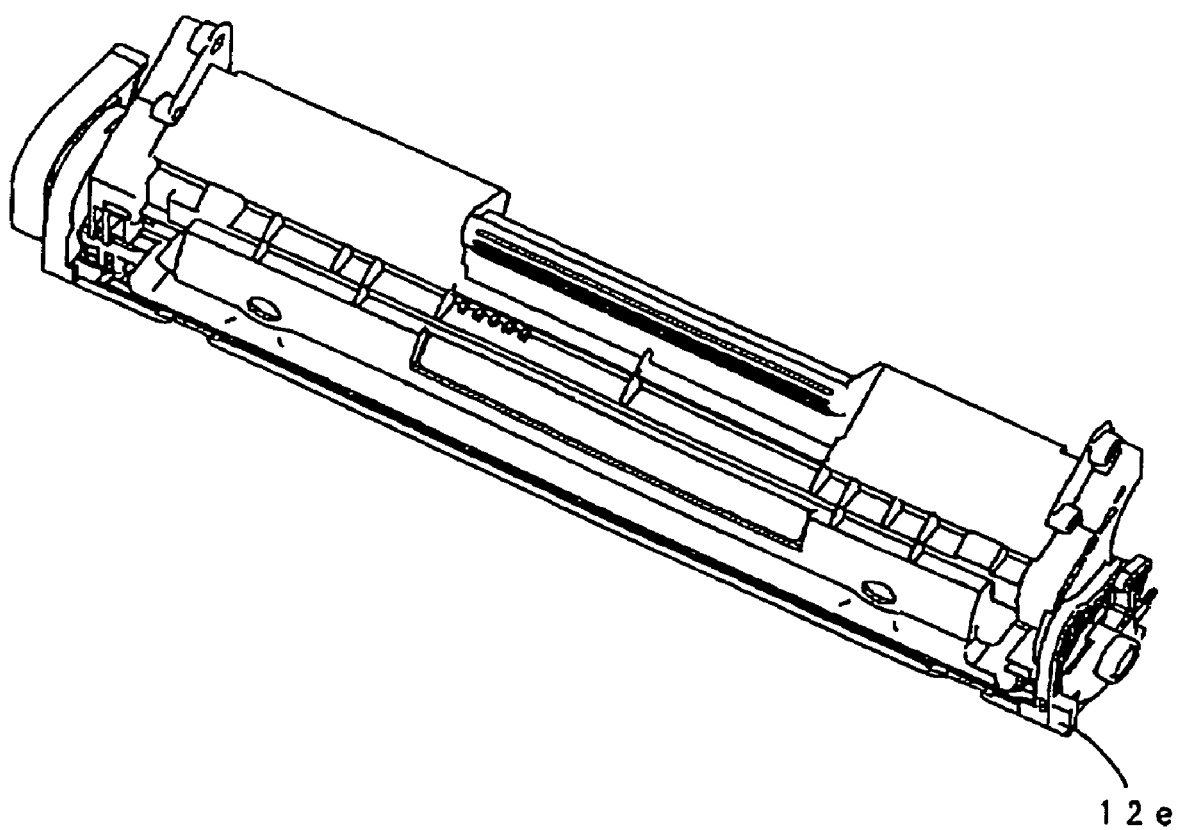
FIG. 5 is another general perspective view of the cleaning unit according to the embodiment of the invention.

When the process cartridge B is in the state of being taken out of the main body of the image forming apparatus A, the drum shutter 12 is maintained in the closed state of covering the transfer opening 9*a* of the photosensitive drum 7, by the springy force of the shutter spring 12*d*, as shown in FIGS. 4 and 5. When the process cartridge B is placed in the main body of the apparatus A in the state of being operable to form an image, the drum shutter 12 is rotated by drum shutter opening/closing means provided in the main body of the apparatus A, thereby assuming the attitude of exposing the transfer opening 9*a* and enabling the photosensitive drum 7 and the transfer roller 4 to abut on each other, as shown in FIGS. 1 and 2.

(Developing Unit)

Figure 6:
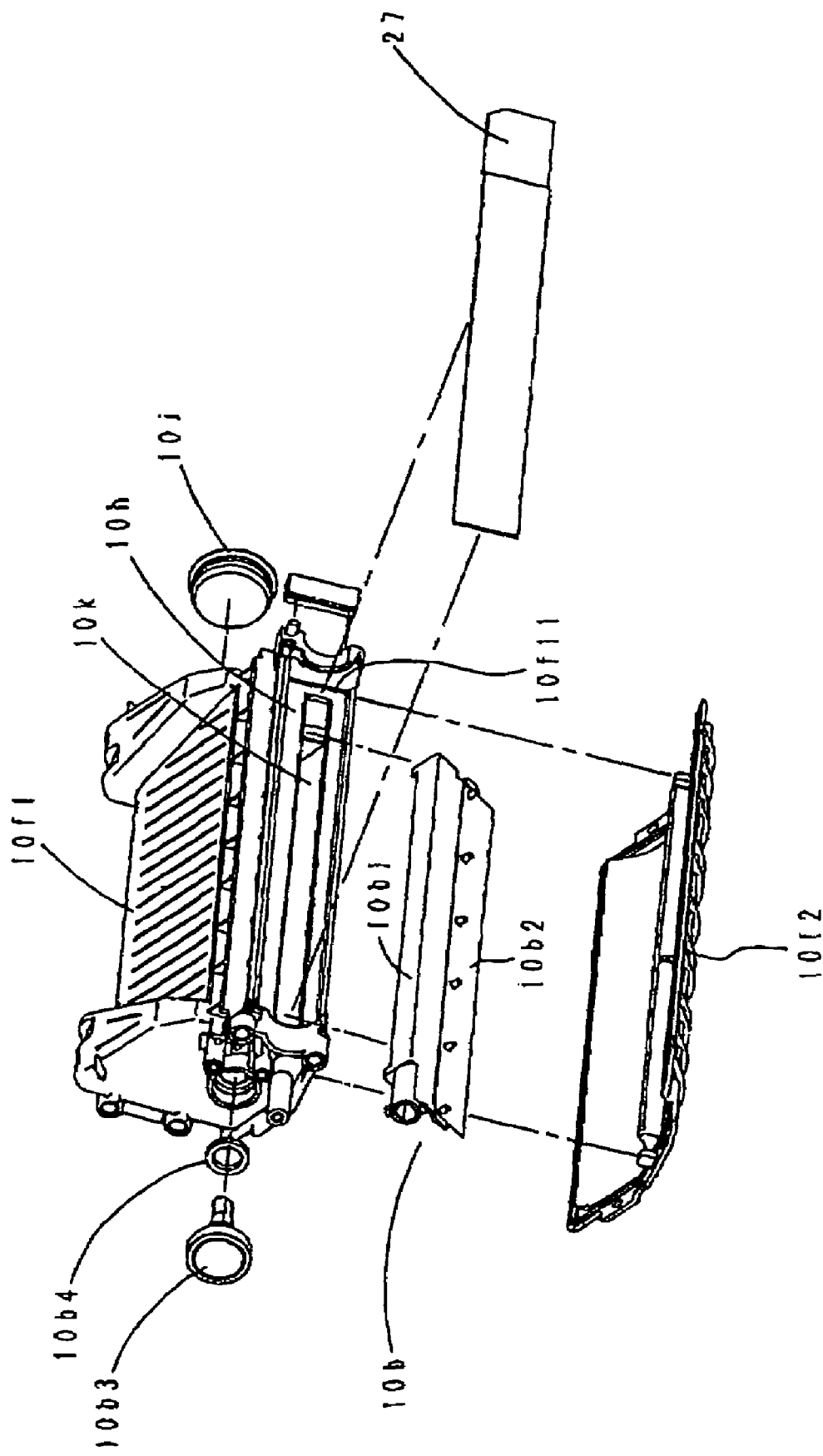
FIG. 6 is one perspective view of a developing unit assembly according to the embodiment of the invention.
Figure 7:
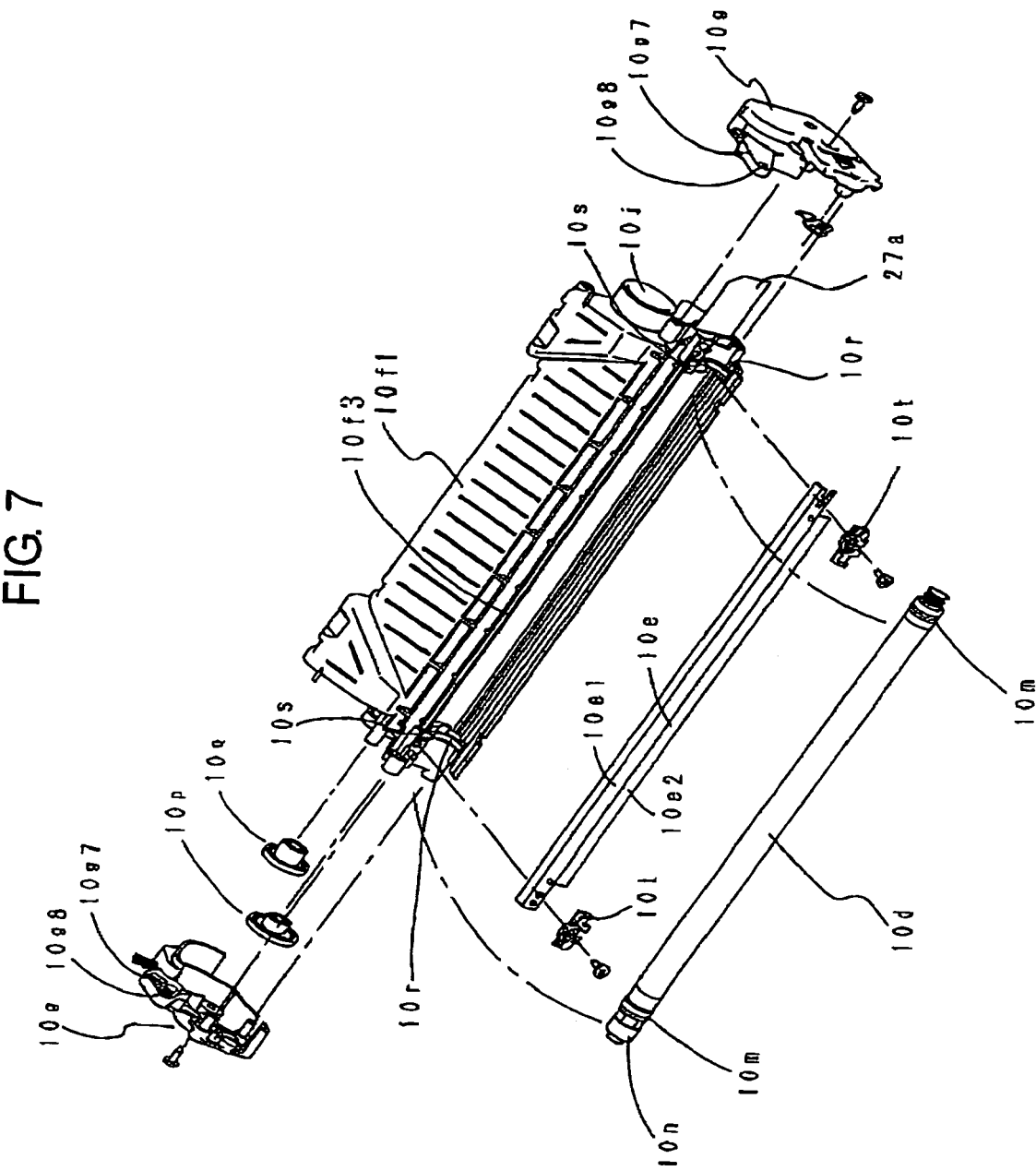
FIG. 7 is another perspective view of the developing unit assembly according to the embodiment of the invention.

The construction of the developing unit 10 which constitutes part of the cartridge B will be described below with reference to FIGS. 2, 6 and 7. FIGS. 6 and 7 are assembling perspective views of the developing unit 10 according to this embodiment.

The developing unit 10 has the toner chamber 10*a* and a developing chamber 10*i* which are defined by connecting the toner developing frame 10*f*1 and a lid member 10*f*2 as shown in FIG. 6.

The frame 10*f*1 contains a stirring shaft 10*b*1 for supplying the developer (hereinafter referred to the toner) and a sheet member 10*b*2 fixed to the stirring shaft 10*b*1. The frame 10*f*1 is provided with a toner passing opening 10*k* through which the toner accommodated in the toner chamber 10*a* is supplied to the developing roller 10*d*.

A transport gear 10*b*3 restricts driving transmission and the longitudinal position of the stirring shaft 10*b*1, and is connected to the stirring shaft 10*b*1 together with a seal member 10*b*4 for preventing the toner from leaking from the toner developing frame 10*f*1.

A toner seal member 27 is thermally fixed to a seal mounting portion 10*h* along the four edges of the toner passing opening 10*k*. One longitudinal end of the frame 10*f*1 is provided with a toner filling port (not shown) for filling the toner chamber 10*a* with the toner, and the toner filling port is sealed with a cap member 10*j* after the toner chamber 10*a* has been filled with the toner.

Furthermore, as shown in FIG. 7, end seals 10*r* for preventing leak of toner at both ends of the developing roller 10*d* are secured to the frame 10*f*1. In addition, seal members 10*s* for preventing leak of toner at both ends of the developing blade 10*e* are stuck to the frame 10*f*1 and the lid member 10*f*2 by double sided adhesive tape or the like.

The developing blade 10*e* is fixed in such a manner that both ends of a sheet metal portion 10*e*1 are fixed to the frame 10*f*1 together with scraping members 10*t* for scraping the toner at the end portions of the developing roller 10*d*, by means of machine screws. A rib 10*f*3 formed by tapering a front edge of the frame 10*f*1 is set to a size which enables the rib 10*f*3 to surely cut into a developing blade rubber portion 10*e*2 at this time. Thus, the developing blade rubber portion 10*e*2 and the toner developing frame 10*f*1 are hermetically sealed.

One of the end members 10*g* disposed at both longitudinal ends of the developing unit 10 covers a developing roller gear 10*n* which is fixed to one end of the developing roller 10*d* meshed with a drum gear (not shown) fixed to one end of the photosensitive drum 7, and a gear train made of two idler gears 10*p* and 10*q* for transmitting driving from the developing roller gear 10*n* to the transport gear 10*b*3 of the toner feeding member 10*b*.

A toner seal end portion 27*a* of the toner seal member 27 is folded back at one longitudinal end of the toner passing opening 10*k* and is drawn out through a hole 10*f*11 (refer to FIG. 6) of the toner developing frame 10*f*1.

(Connection Between Developing Unit and Cleaning Unit)

Figure 8:
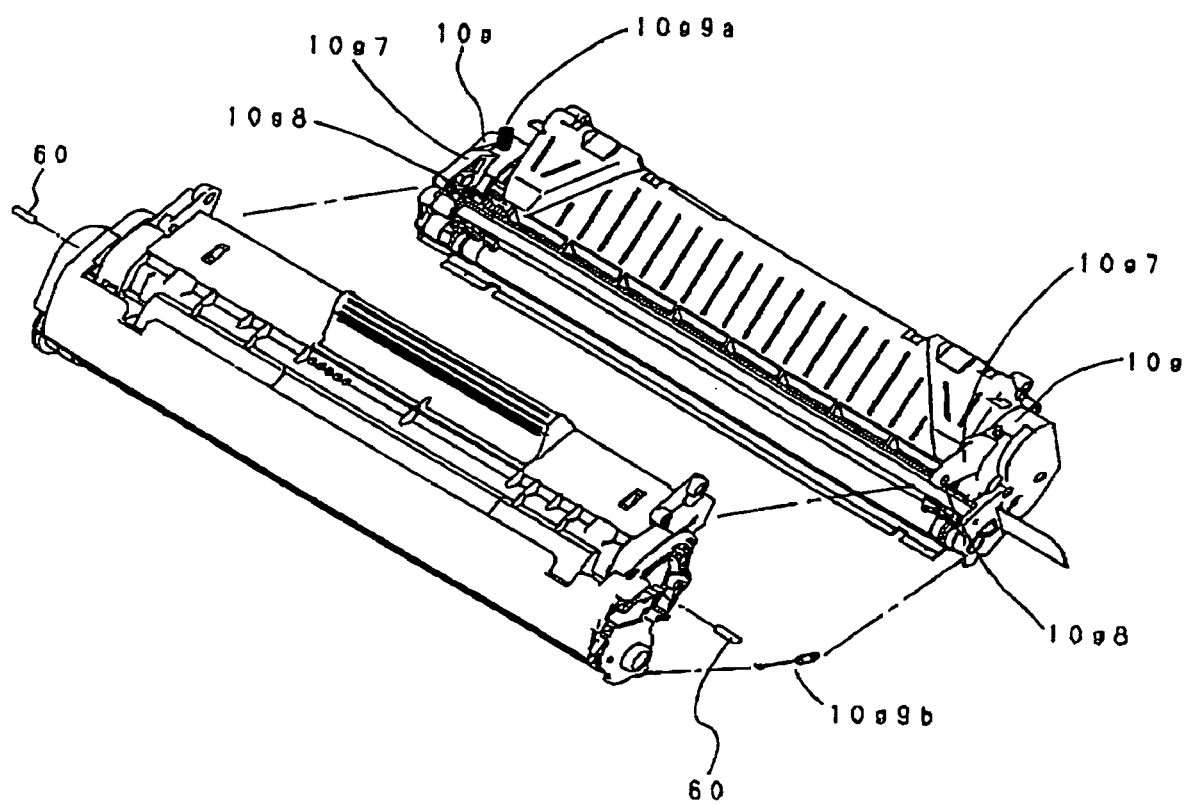
FIG. 8 is a perspective view of a process cartridge assembly according to the embodiment of the invention.
Figure 9:
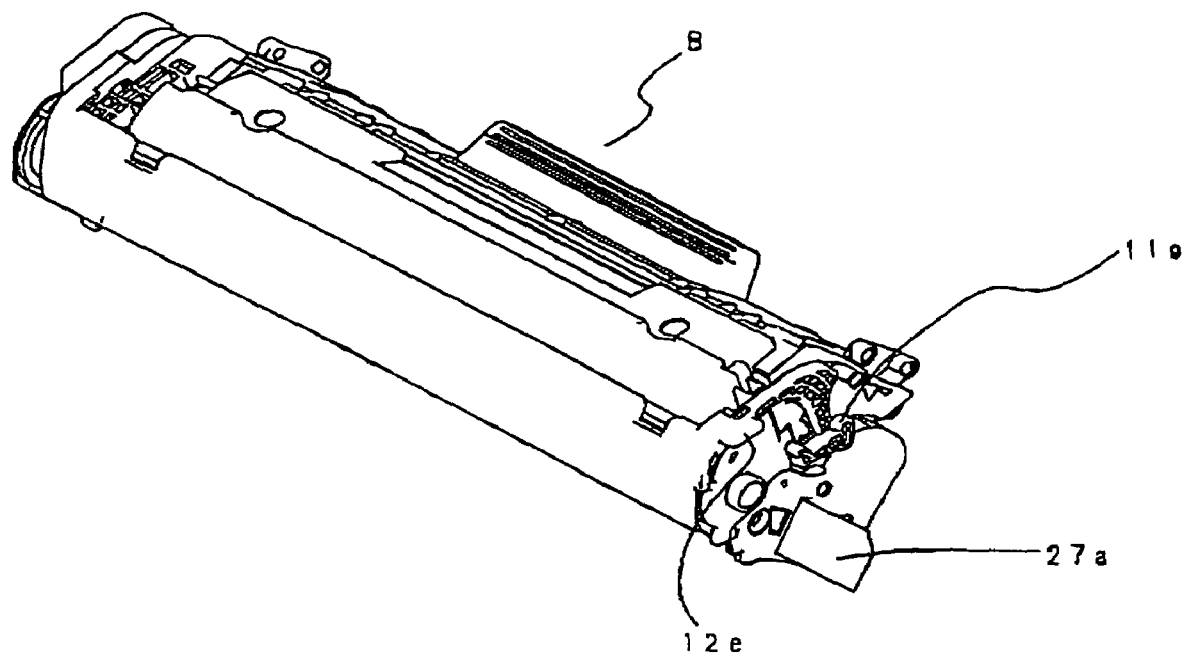
FIG. 9 is a general perspective view of the process cartridge according to the embodiment of the invention.

The assembly of the cartridge B will be described below in detail with reference to FIGS. 8 and 9. FIG. 8 is an assembling perspective view of the cartridge B according to this embodiment, and FIG. 9 is a general perspective view of the cartridge B according to this embodiment.

The cartridge B is assembled by connecting the developing unit 10 and the cleaning unit 11.

The two end members 10*g* disposed at both ends of the developing unit 10 are respectively provided with arm portions 10*g*7 which project toward the cleaning frame 11*d*. The cleaning frame 11*d* and the end members 10*g* can be turnably connected together by longitudinal connecting holes 10*g*8 provided in the end portions of the respective arm portions 10*g*7 and pins 60 respectively fitted into connecting holes (not shown) provided in the cleaning frame 11*d*.

A compression coil spring 10*g*9*a* having an inside diameter fitted into a spring stopper is provided in compression between one of the end members 10*g* and the cleaning frame 11*d*. A tension spring 10*g*9*b* is passed between the other of the end members 10*g* and the cleaning frame 11*d*. Owing to this construction, the spacers 10*m* provided at both ends of the developing roller 10*d* and the photosensitive drum 7 are kept in pressure contact with each other. The developing roller 10*d* and the photosensitive drum 7 are retained with the predetermined spaced interposed therebetween, whereby the cartridge B is finished.

When a user is to use the cartridge B after having bought it, the user grips the toner seal end portion 27*a* of FIG. 9 and pulls out the toner seal member 27. In this manner, the toner passing opening 10*k* of the frame 10*f*1 is opened so that the toner can be fed from the toner chamber 10*a* to the developing chamber 10*i*. Thus, preparations for inserting the cartridge B into the main body of the apparatus A are completed.

(Loading and Unloading of Process Cartridge into and from Main Body of Image Forming Apparatus)

Figure 10:
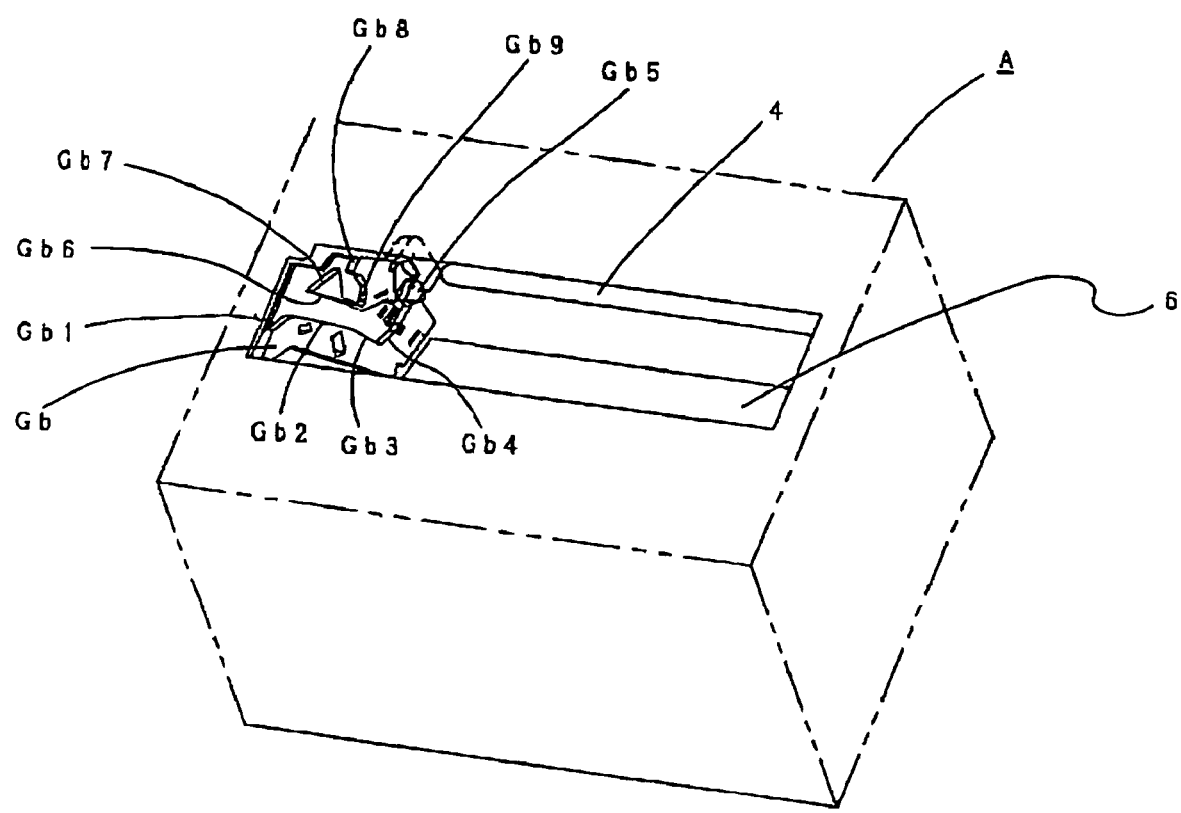
FIG. 10 is a schematic perspective view of a left guide provided on a main body of an image forming apparatus according to the embodiment of the invention.
Figure 11:
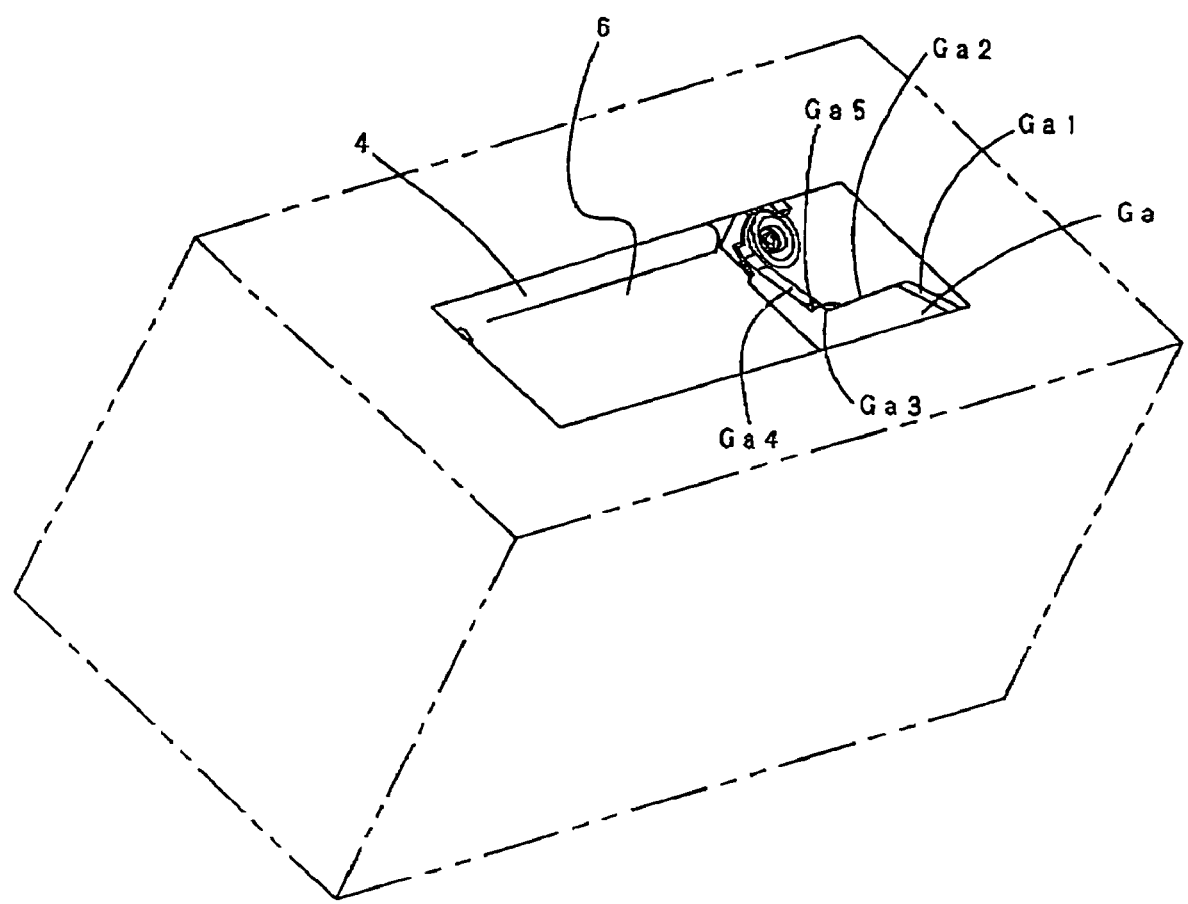
FIG. 11 is a schematic perspective view of a right guide provided on the main body of the image forming apparatus according to the embodiment of the invention.
Figure 12:
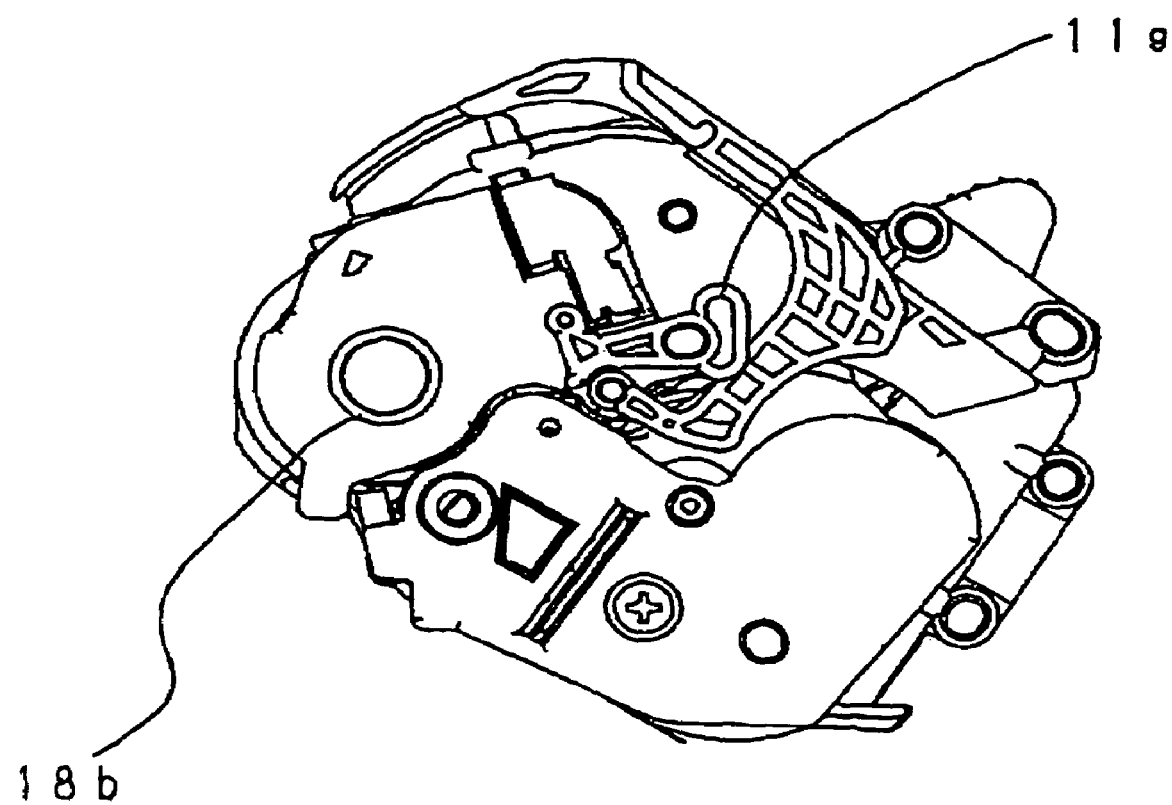
FIG. 12 is a left side view of the process cartridge according to the embodiment of the invention.
Figure 13:
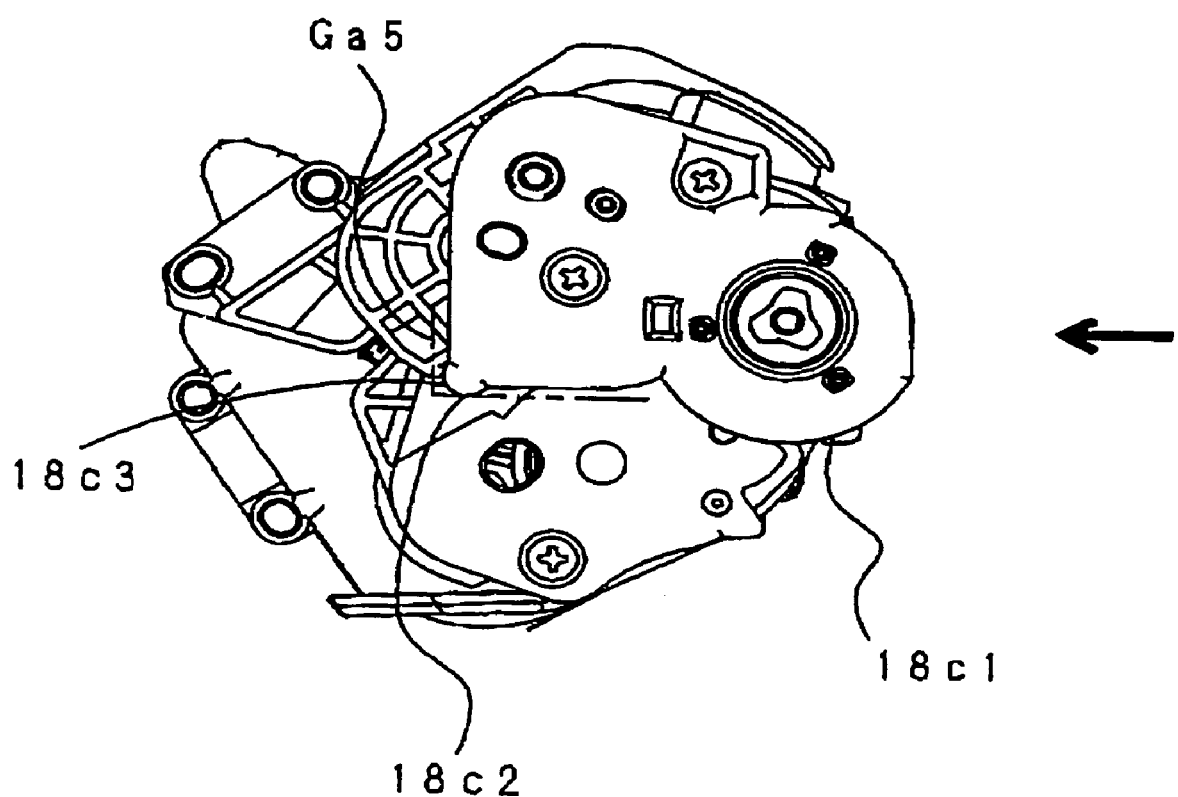
FIG. 13 is a right side view of the process cartridge according to the embodiment of the invention.

The manner of loading the cartridge B assembled in the above-described manner into the main body of the apparatus A will be described below with reference to FIGS. 9 to 13. FIG. 10 is a perspective view of a left guide provided on the main body of the apparatus A, FIG. 11 is a perspective view of a right guide provided on the main body of the apparatus A, FIG. 12 is a left side view of the process cartridge B, and FIG. 13 is a right side view of the process cartridge B.

The bearing member 18*c* secured to the cleaning frame 11*d* of the cartridge B is provided with a circular-arc portion 18*c*1 (refer to FIG. 4) which serves as a first abutment portion formed coaxially with the axis of the photosensitive drum 7 and a rotation stopping portion 18*c*2 (refer to FIG.

4) which serves as a second abutment portion formed in a circular-arc-like shape for controlling the attitude of the cartridge B, the rotation stopping portion 18c2 being positioned in a corner of the bearing member 18c and formed at the bottom of a cartridge frame, as a loaded guide into the main body of the apparatus A.

The circular-arc portion 18c1 is disposed in such a manner as to be positioned at the outside of the developing unit 10 as viewed in the direction of the drum axis of the developing unit 10 and to overlap the developing unit 10 at least in part as viewed in cross section. The rotation stopping portion 18c2 is positioned at the outside of the developing unit 10, and overlaps the developing unit 10 in all the axial directions of the photosensitive drum 7. In addition, the rotation stopping portion 18c2 is disposed at the rear of the circular-arc portion 18c1 as viewed in the inserting direction.

In this embodiment, the triangular coupling 70 which receives driving force from the main body of the apparatus A is disposed on the inside of the bearing member 18c as viewed in the direction of the drum axis.

As shown in FIG. 11, the main body of the apparatus A is provided with a guide member Ga which serves as a first body guide for guiding the cartridge B to an image forming position (or loading position) while sliding the above-described two circular-arc portions 18c1 and rotation stopping portion 18c2.

In addition, the side of the cleaning frame 11d that is opposite to the bearing member 18c of the cartridge B as viewed in the direction of the drum axis is provided with the positioning portion 18b for covering the positioning pin 18d, and a projecting portion 11g for controlling the position of the cartridge B during loading and unloading.

In addition, as shown in FIG. 10, the main body of the apparatus A is provided with a guide member Gb which serves as a second body guide, so that the attitude of the cartridge B that is controlled on the side of the bearing member 18c can be similarly held on the opposite side to prevent the cartridge B from becoming oblique with respect to the direction of the drum axis.

The manner of loading the cartridge B into the main body of the apparatus A will be described below.

At first, an openable lid member (not shown) which constitutes the discharge section 6 of the main body of the apparatus A is opened to expose the guide members Ga and Gb. Then, the circular-arc portion 18c1 and the rotation stopping portion 18c2 of the cartridge B are placed on a first guide surface Ga1 whose front portion is somewhat bent, of this guide member Ga, in such a manner that the circular-arc portion 18c1 of the cartridge B takes a front position, while the rotation stopping portion 18c2 of the cartridge B takes a rear position. Accordingly, the positioning portion 18b and the projecting portion 11g of the cartridge B are brought into abutment with a first guide surface Gb1 of the other guide member Gb.

In this state, the cartridge B is forced inwardly of the main body of the apparatus A.

When the cartridge B is forced inwardly, the circular-arc portion 18c1 and the rotation stopping portion 18c2 of the cartridge B are slidingly guided to a loading position which is defined by a second guide surface Ga2 provided in a direction approximately perpendicular to the first guide surface Ga1, a third guide surface Ga3 provided to extend approximately horizontally from the second guide surface Ga2, and a curved, fourth guide member Ga4 which is provided in a form continuous with the third guide surface Ga3.

In this manner, the circular-arc portion 18c1 of the cartridge B is brought into abutment with the fourth guide surface Ga4 which serves as a first body receiving portion. In addition, the rotation stopping portion 18c2 is placed onto the third guide surface Ga3 with its rear curved surface portion held in abutment with the second guide surface Ga2. In this placed state, the transfer roller 4 and the photosensitive drum 7 are brought into abutment with each other, and a repulsive force is given to the cartridge B in the direction of the arrow shown in FIG. 13. At this time, a third abutment portion 18c3 is brought into abutment with a fifth guide surface Ga5 positioned in the vicinity of the third guide surface Ga3, to prevent the positional deviation of the cartridge B. Incidentally, the third abutment portion 18c3 may be integral with or separate from the rotation stopping portion 18c2 which serves as the second abutment portion.

In the meantime, the positioning portion 18b and the projecting portion 11g of the cartridge B that are disposed on the opposite side are slidingly guided to the loading position which is defined by a plurality of guide surfaces such as a second guide surface Gb2, a third guide surface Gb3 and a fourth guide surface Gb4 all of which are provided continuously with the first guide surface Gb1. The positioning portion 18b is finally guided to a positioning position Gb5.

In the above-described manner, the cartridge B is loaded at the loading position relative to the main body of the apparatus A. Then, when the lid of the main body of the apparatus A is closed, the triangular coupling 70 of the cartridge B meshes with an approximately triangular concave driving transmitting member (not shown) of the main body of the apparatus A. In this manner, rotational driving force is transmitted from the main body of the apparatus A to the cartridge B.

In this manner, the cartridge B rotates about its rotational central axis which is the axis of the photosensitive drum 7. At this time, the third abutment portion 18c3 of the bearing member 18c in abutment with the guide and the fifth guide surface Ga5 are spaced apart from each other, and the rotation stopping portion 18c2 of the bearing member 18c is brought into abutment with the third guide surface Ga3 which is a defining surface of the guide member Ga, thereby effecting positioning relative to the rotating direction.

In the meantime, as the result of the loading of the cartridge B, the positioning portion 18b located on the drum axis of the cleaning frame 11d on the opposite side as viewed in the direction of the drum axis is fitted into a U-shaped groove which is formed by the fourth guide surface Gb4 and serves as a positioning portion. Thus, the positioning portion 18b is positioned by a pressure spring (not shown) for restraining the repulsive force of the transfer roller 4 and the fluctuation of the same during driving. The projecting portion 11g of the cleaning frame 11d is set to a position and a size which can prevent the projecting portion 11g from coming into abutment with the main body of the apparatus A, within the range of the precision of each part and the precision of assembly.

At an intermediate time during the above-described loading operation, the rib 12e of the drum shutter 12 is brought into abutment with a first shutter guide surface Gb7 formed on the guide member Gb. Then, the rotating operation of the drum shutter 12 starts. After that, in accordance with the manner of loading the cartridge B, the rib 12e is brought into abutment with a second shutter guide surface Gb8 and slides over the second shutter guide surface Gb8, and the drum shutter 12 is finally retained in the state shown in FIGS. 1 and 2 on a third guide surface Gb9.

The attitude of the cartridge B for image formation is prepared in the above-described manner, and image formation is started.

When the cartridge B is to be removed from the main body of the apparatus A, the cartridge B is removed from the loading position to the outside of the apparatus along the corresponding guide members Ga and Gb of the main body of the image forming apparatus A in accordance with the reverse operation to the above-described loading operation. At the same time, the drum shutter 12 sequentially rotates and closes to cover the photosensitive drum 7.

Incidentally, while the cartridge B is being unloaded from the loading position, the projecting portion 11g comes into contact with the positioning position Gb5 formed on the upper surface of the guide member Gb, and works to prevent the forward side of the cartridge B as viewed in the unloading direction from trying to rotate upwardly beyond a predetermined amount.

(Method of Supplying and Moving Parts in Assembly Facility)

Figure 14:
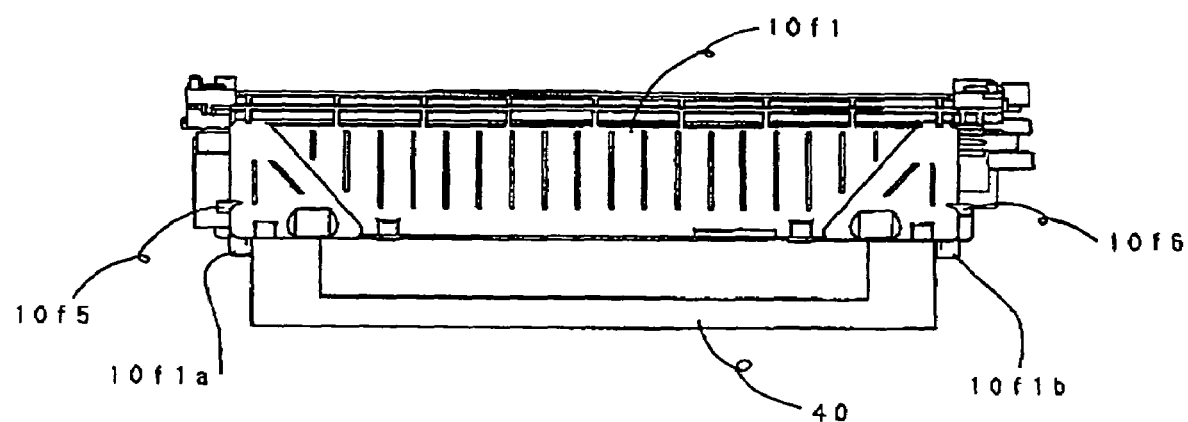
FIG. 14 is a front view showing the state in which a toner developing frame according to the embodiment of the invention is placed on a guide rail.
Figure 15:
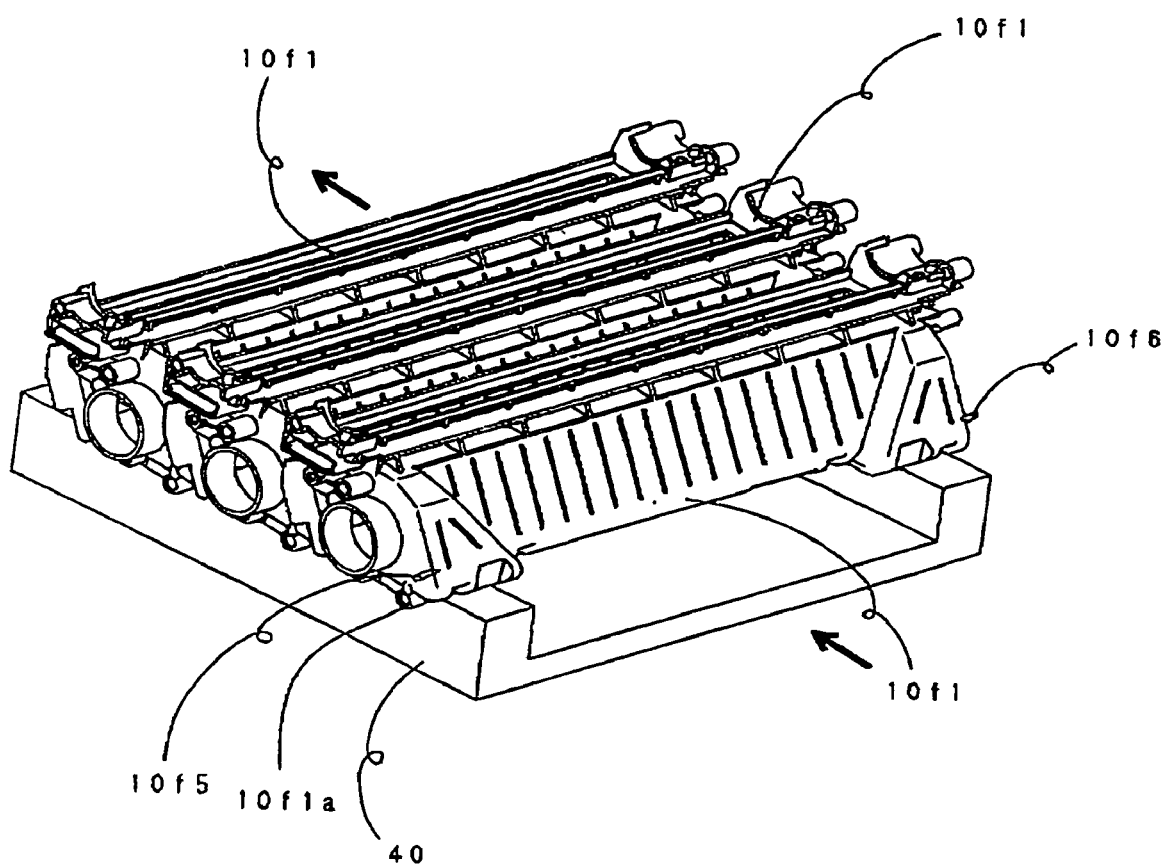
FIG. 15 is a perspective view from one position showing the state in which a plurality of toner developing frames according to the embodiment of the invention is placed on the guide rail.
Figure 16:
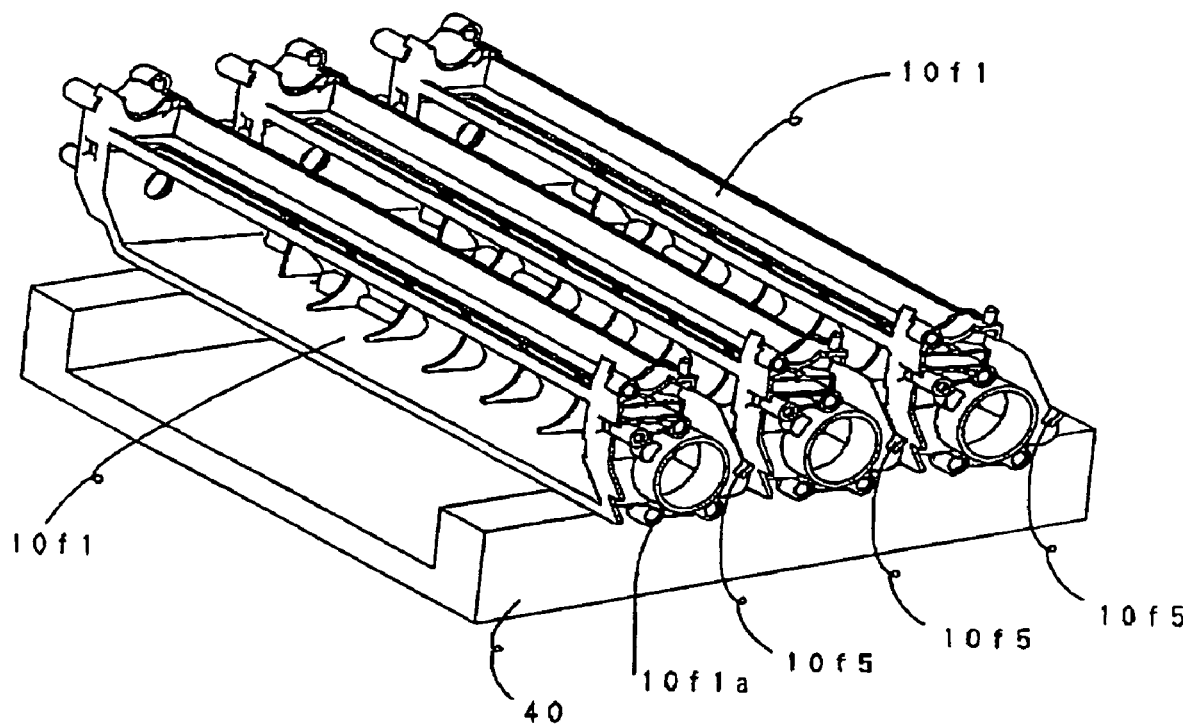
FIG. 16 is a perspective view from another position showing the state in which the plurality of toner developing frames according to the embodiment of the invention is placed on the guide rail.
Figure 17:
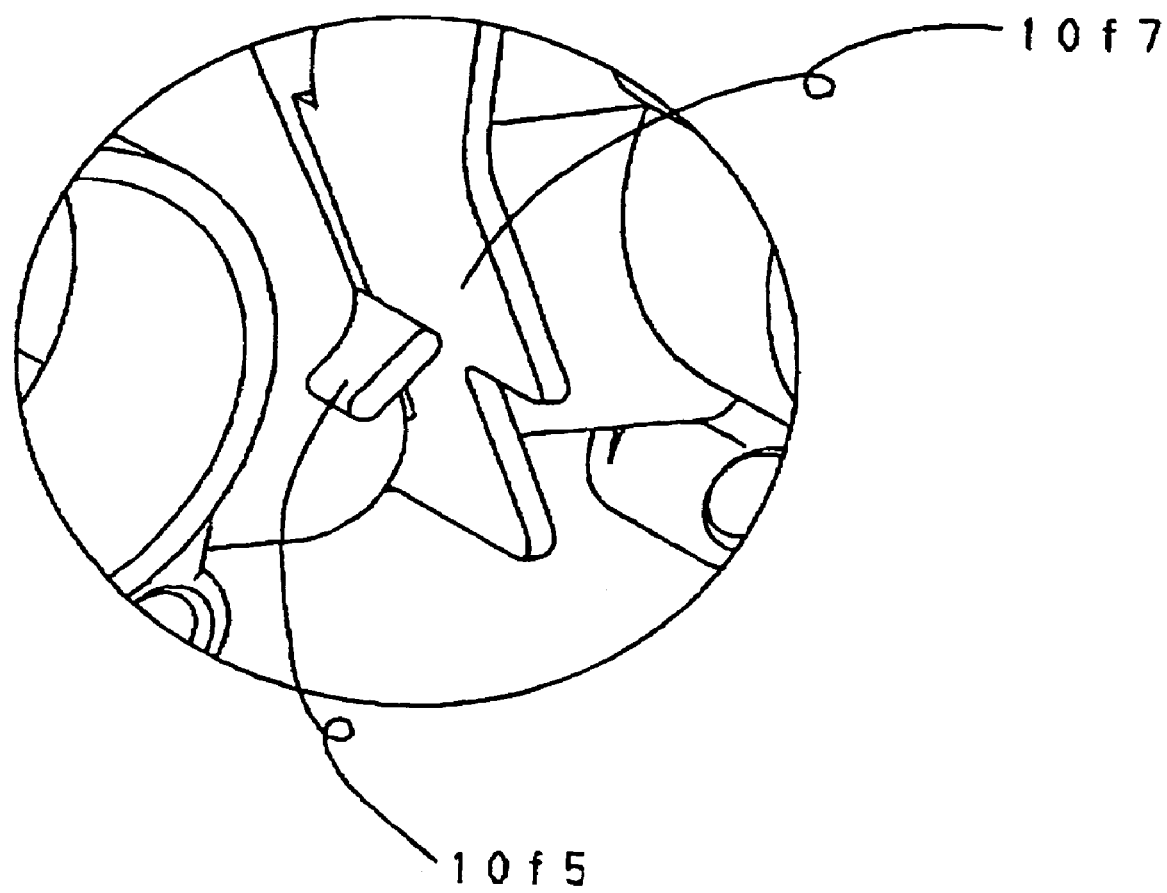
FIG. 17 is a magnified partial perspective view showing the state of abutment between a projection of the toner developing frame and an abutment surface according to the embodiment of the invention.

A method of supplying the toner developing frame 10/1 in the assembly process of the cartridge B will be described below with reference to FIGS. 14 through 17. FIG. 14 is a front view showing the state in which the toner developing frame 10/1 is placed on a guide rail, FIGS. 15 and 16 are perspective views showing the state in which a plurality of toner developing frames 10/1 are placed on the guide rail, and FIG. 17 is a magnified partial perspective view showing the state of abutment between a projection of the frame 10/1 and an abutment surface.

The frame 10/1 which is a part constituting the cartridge B is placed on a guide rail 40 in a part supplying station in an assembly factory.

The guide rail 40 has a concave shape, and its surfaces are formed by good slip material, for example polyacetal (hereinafter referred to as "POM").

The frame 10/1 has projections 10/1a and 10/1b which serve as abutment portions, at both longitudinal ends, respectively. The inside surfaces of the respective projections 10/1a and 10/1b have a dimensional relationship which produces a predetermined amount of looseness with respect to the outside surfaces of the concave portion of the guide rail 40.

First of all, a first frame 10/1 is placed on the guide rail 40. Then, a second frame 10/1 is placed in the same attitude as the first one. Then, the frames 10/1 are moved in the direction of the arrows shown in FIG. 15. Incidentally, the movement of the frames 10/1 may be performed with a moving arm 50 (refer to FIG. 32) which will be described later, or by the manual operation of a worker.

Owing to this movement, on the side of the toner filling port, as shown in FIG. 17, a projection 10/5 provided on the first frame 10/1 and an abutment surface 10/7 which is provided on the next frame 10/1 as a receiving portion are brought into abutment with each other.

In addition, on the side of the frame 10/1 that is longitudinally opposite to the projection 10/5, a projection 10/6 and an abutment surface (not shown) which serves as a receiving portion are brought into abutment with each other. Then, each of the frames 10/1 is moved along the guide rail 40 by a distance equivalent to the size of one frame. When a third frame 10/1 (as well as the following ones) is supplied, the frames 10/1 are similarly moved. Accordingly, the frames 10/1 can be arranged in a line in the same attitude and moved from the supplying station to the position of an assembly station.

According to this part supplying method, it is not necessary to place parts into individual conveying containers for moving the parts, arrange the conveying containers in a line, and convey the parts to the assembly station.

In the case where the frame 10/1 is placed on the guide rail 40, portions, such as the projections 10/5 and 10/6 and the abutment surface 10/7, which are brought into abutment with other portions during the movement of the frame 10/1 are disposed at locations separate from any important portion of the part. Accordingly, it is possible to convey the part while protecting any important portion required to have dimensional precision against damage due to contact between adjacent parts during the movement of the part.

More specifically, the projections 10/5 and 10/6, the abutment surface 10/7 and the like are provided in portions of the frame 10/1 which differ from the opening of the toner chamber 10a. Accordingly, during the movement of the frame 10/1, it is possible to convey the toner developing frame 10/1 without causing damage to or deforming any portion other than its abutment portions, for example, a portion which is required to have dimensional precision.

Figure 18:
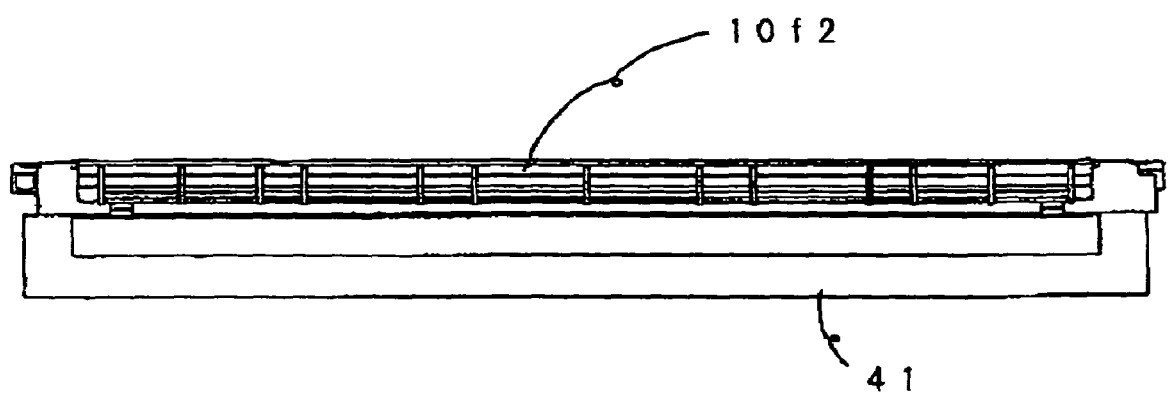
FIG. 18 is a front view showing the state in which a lid member according to the embodiment of the invention is placed on a guide rail.
Figure 19:
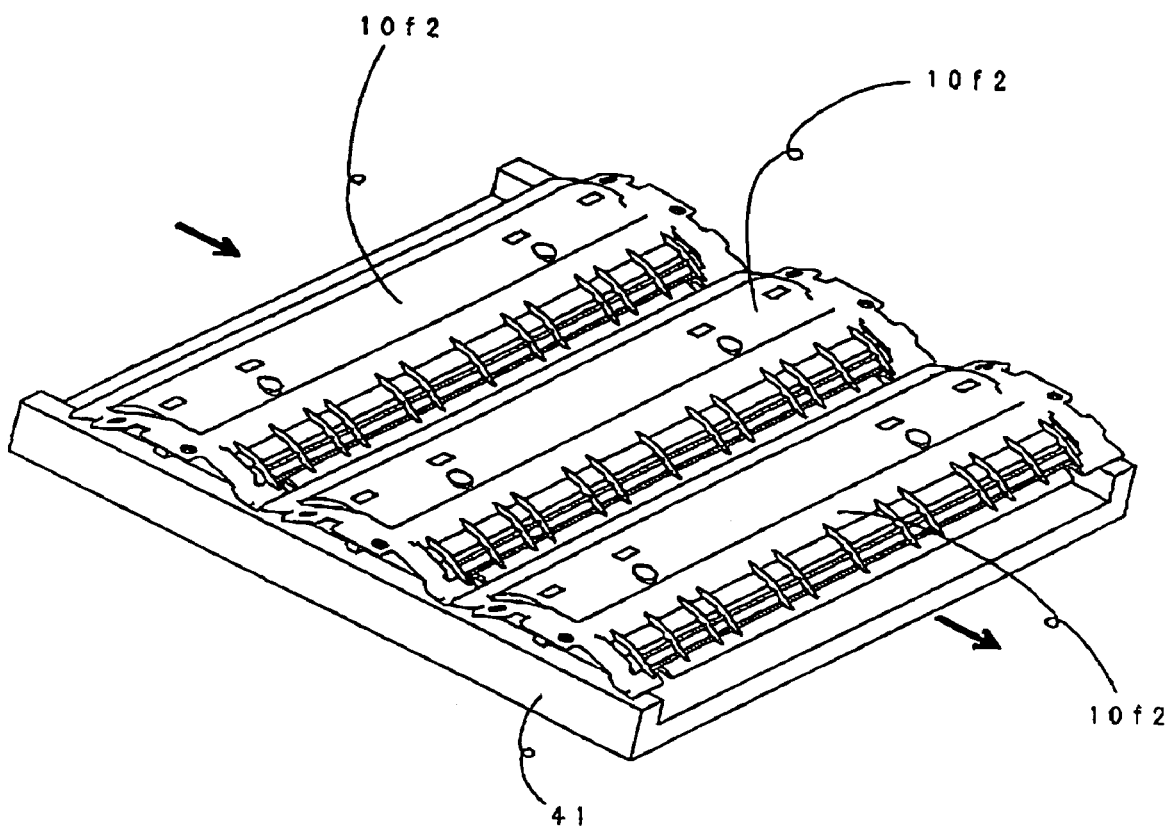
FIG. 19 is a perspective view from one position showing the state in which the plurality of lid members according to the embodiment of the invention is placed on the guide rail.
Figure 20:
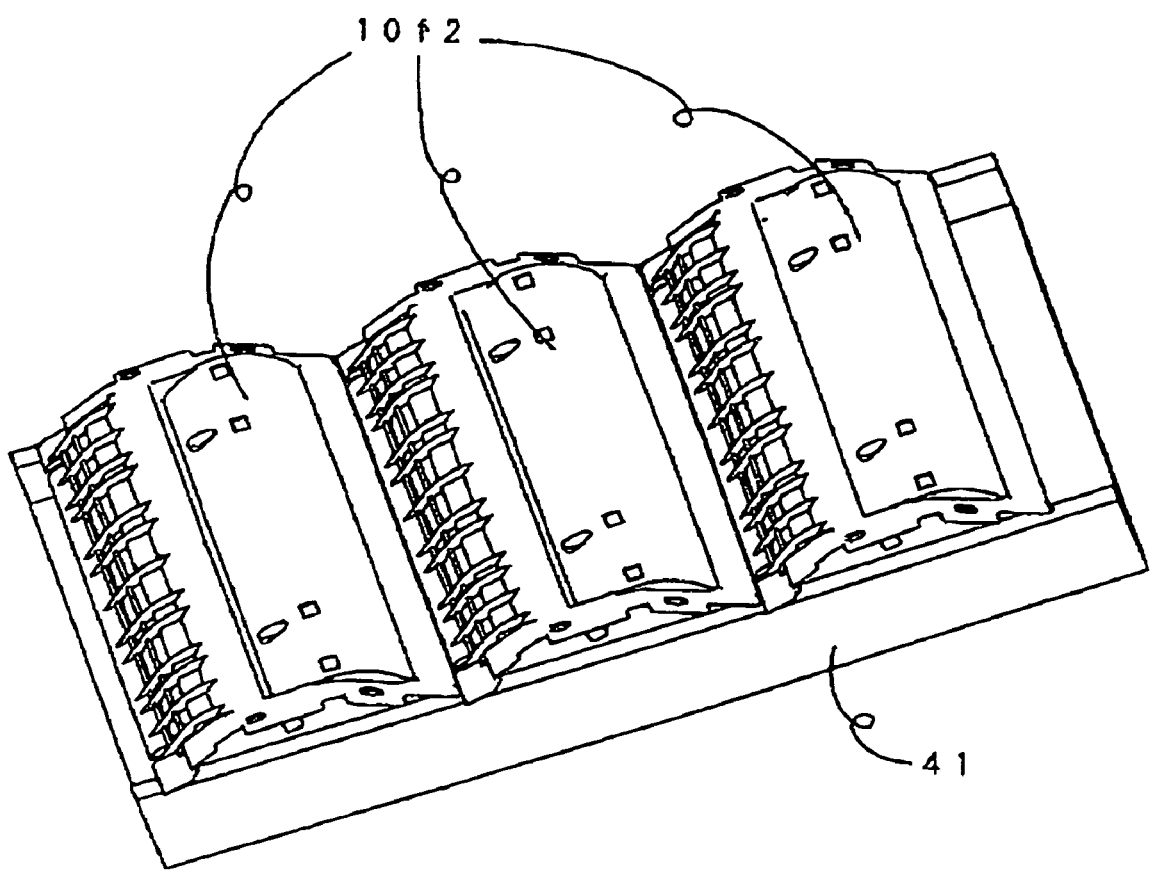
FIG. 20 is a perspective view from another position showing the state in which a plurality of lid members according to the embodiment of the invention is placed on the guide rail.
Figure 21:
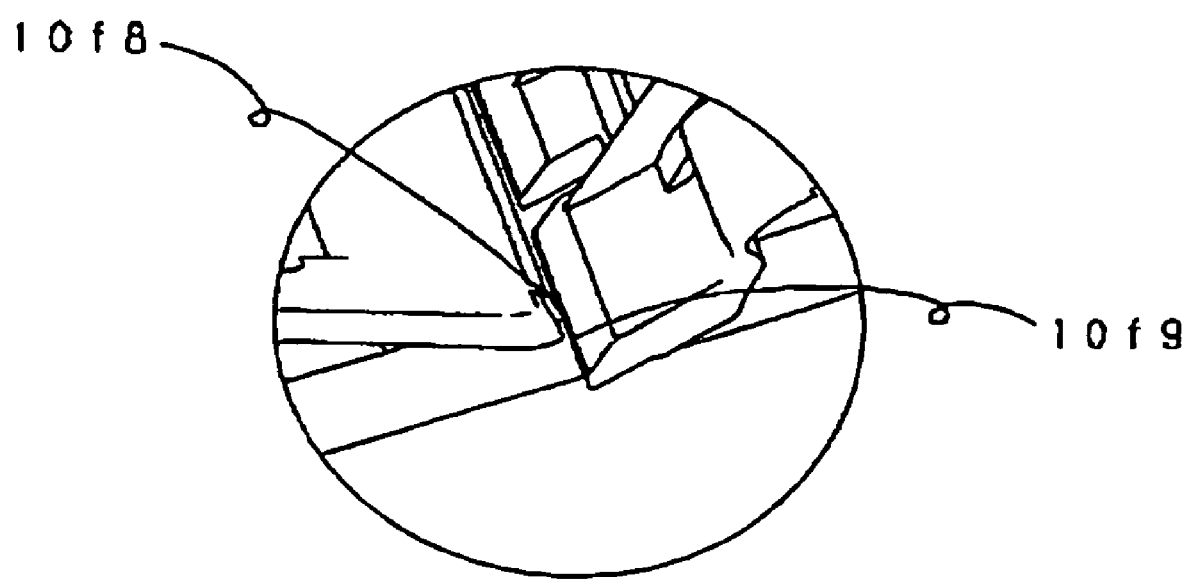
FIG. 21 is a magnified partial perspective view showing the state of abutment between a projection of the lid member and an abutment surface according to the embodiment of the invention.

A method of supplying the lid member 10/2 in the assembly process of the cartridge B will be described below with reference to FIGS. 18 through 21. FIG. 18 is a front view showing the state in which the lid member 10/2 is placed on a guide rail, FIGS. 19 and 20 are perspective views showing the state in which a plurality of lid members 10/2 are placed on the guide rail, and FIG. 21 is a magnified partial perspective view showing the state of abutment between a projection of the lid member 10/2 and an abutment surface.

The lid member 10/2 which is a part constituting the cartridge B is placed on a guide rail 41 in the part supplying station in the assembly factory.

The guide rail 41 has a concave shape, and its surfaces are formed by good slip material, for example POM.

The lid member 10/2 is placed with its surface to oppose the toner chamber 10a facing the guide rail 41. The longitudinal direction of the lid member 10/2 is restricted by a side plate (not shown) which is formed of the same material as the guide rail 41 and has a predetermined amount of looseness with respect to the longitudinal external shape of the lid member 10/2.

First of all, a first lid member 10/2 is placed on the guide rail 41. Then, a second lid member 10/2 is placed in the same attitude as the first one, and the lid members 10/2 are moved in the direction of the arrows shown in FIG. 19. Incidentally, the movement of the lid members 10/2 may be performed with the moving arm 50 (refer to FIG. 32) which will be described later, or by the manual operation of a worker.

Owing to this movement, as shown in FIG. 21, a projection 10/f provided on the first lid member 10/2 as an abutment portion and an abutment surface 10/9 which is provided on the next lid member 10/2 as a receiving portion are brought into abutment with each other.

In addition, on the side of the lid member 10/2 that is longitudinally opposite to the projection 10/f, a projection which serves as an abutment portion (not shown) and an abutment surface which serves as a receiving portion are brought into abutment with each other. Then, each of the lid members 10/2 is moved along the guide rail 41 by a distance equivalent to the size of one lid member. When a third lid member 10/2 (as well as the following ones) is supplied, the lid members 10/2 are similarly moved. Accordingly, the lid members 10/2 can be arranged in a line in the same attitude and moved from the supplying station to the position of the assembly station.

According to this part supplying method, it is not necessary to place parts into individual conveying containers for moving the parts, arrange the conveying containers in a line, and convey the parts to the assembly station.

In the case where the lid member 10/2 is placed on the guide rail 41, portions, such as the projection 10/8 and the abutment surface 10/9, which are brought into abutment with other portions during the movement of the lid member 10/2 are disposed at locations separate from any important portion of the part. Accordingly, it is possible to convey the part while protecting any important portion required to have dimensional precision against damage due to contact between adjacent parts during the movement of the part.

More specifically, the projection 10/8, the abutment surface 10/9 and the like are provided in portions of the lid member 10/2 which differ from the surface to oppose the toner chamber 10a which plays an important role in the cartridge B. Accordingly, during the movement of the lid member 10/2, it is possible to convey the lid member 10/2 without damaging or deforming any portion other than its abutment portions, for example, a portion which is required to have dimensional precision.

Figure 22:
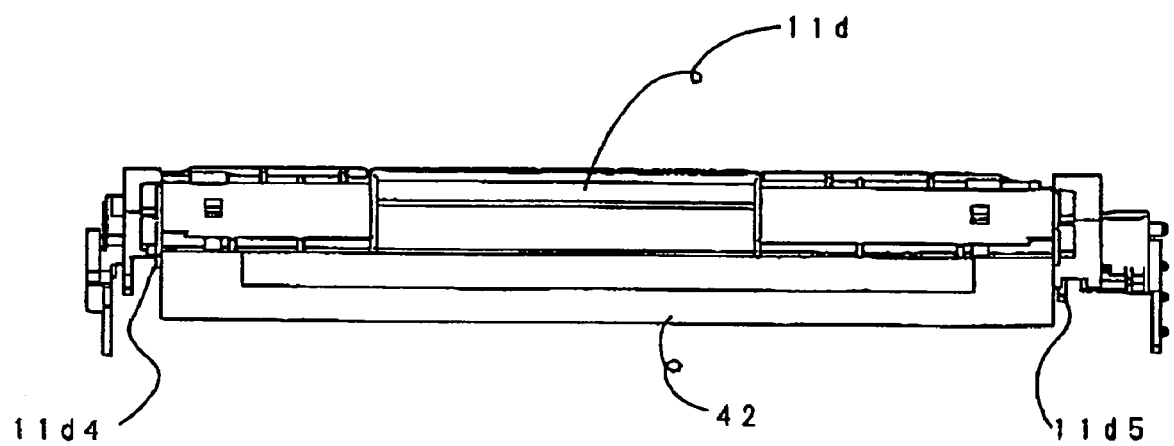
FIG. 22 is a front view showing the state in which the cleaning frame according to the embodiment of the invention is placed on a guide rail.
Figure 23:
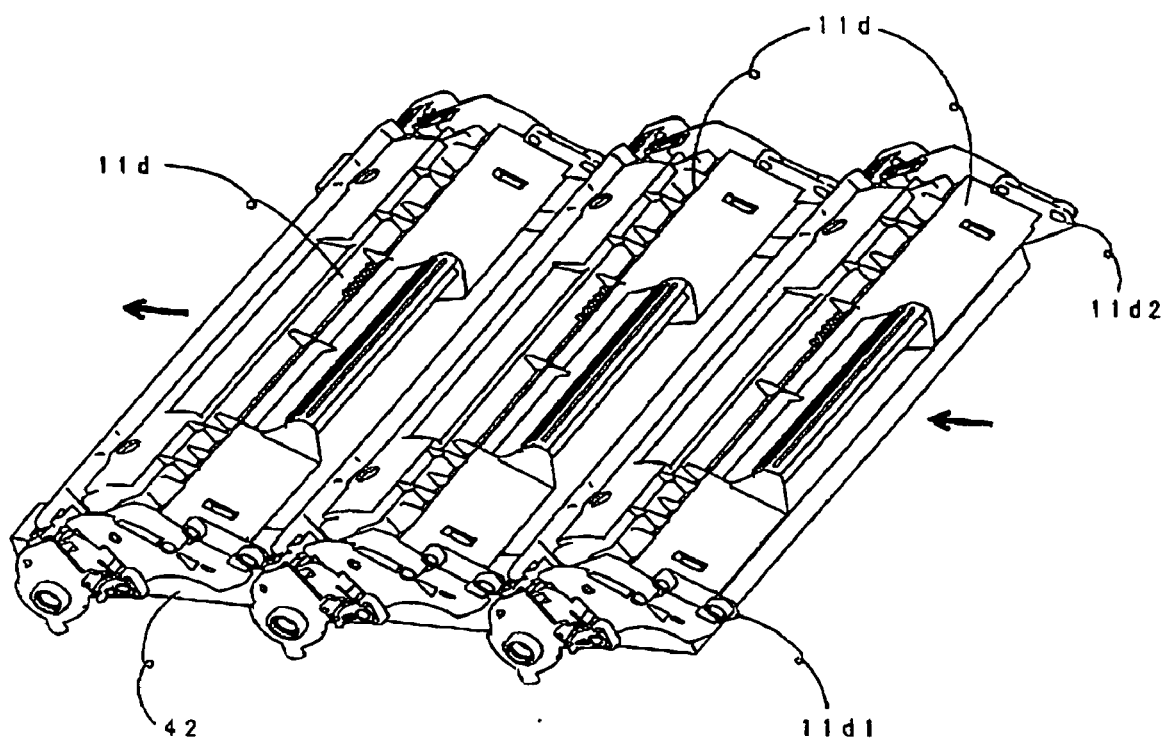
FIG. 23 is one perspective view showing the state in which a plurality of cleaning frames according to the embodiment of the invention is placed on the guide rail.
Figure 24:
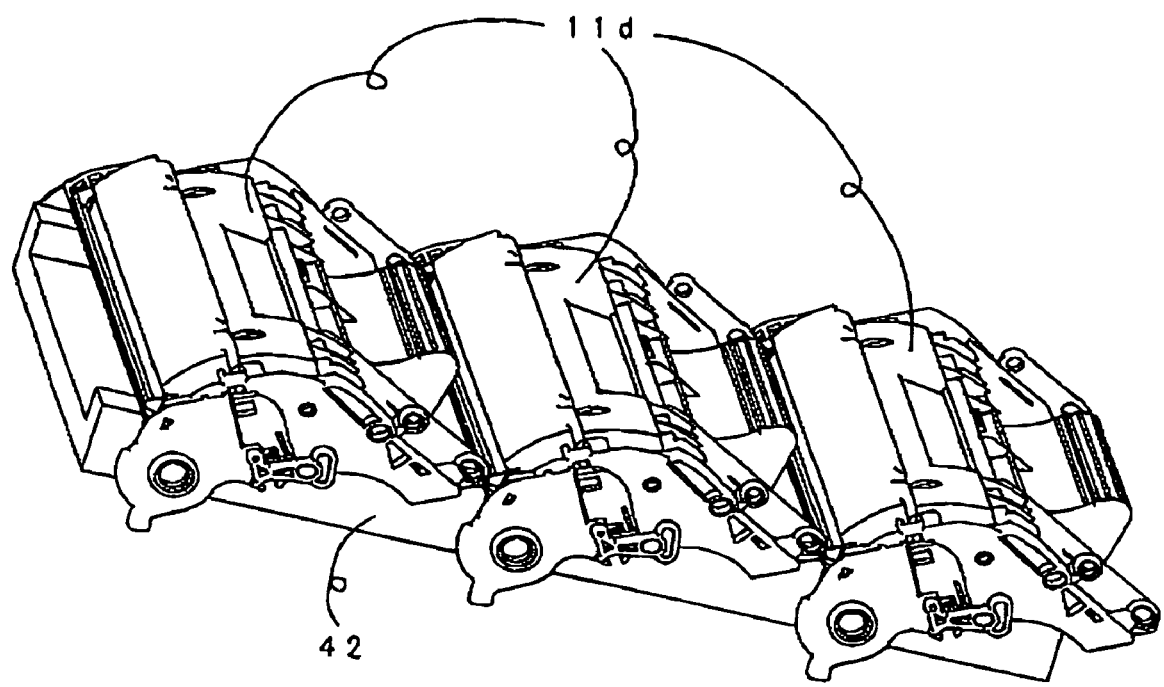
FIG. 24 is another perspective view showing the state in which the plurality of cleaning frames according to the embodiment of the invention is placed on the guide rail.
Figure 25:
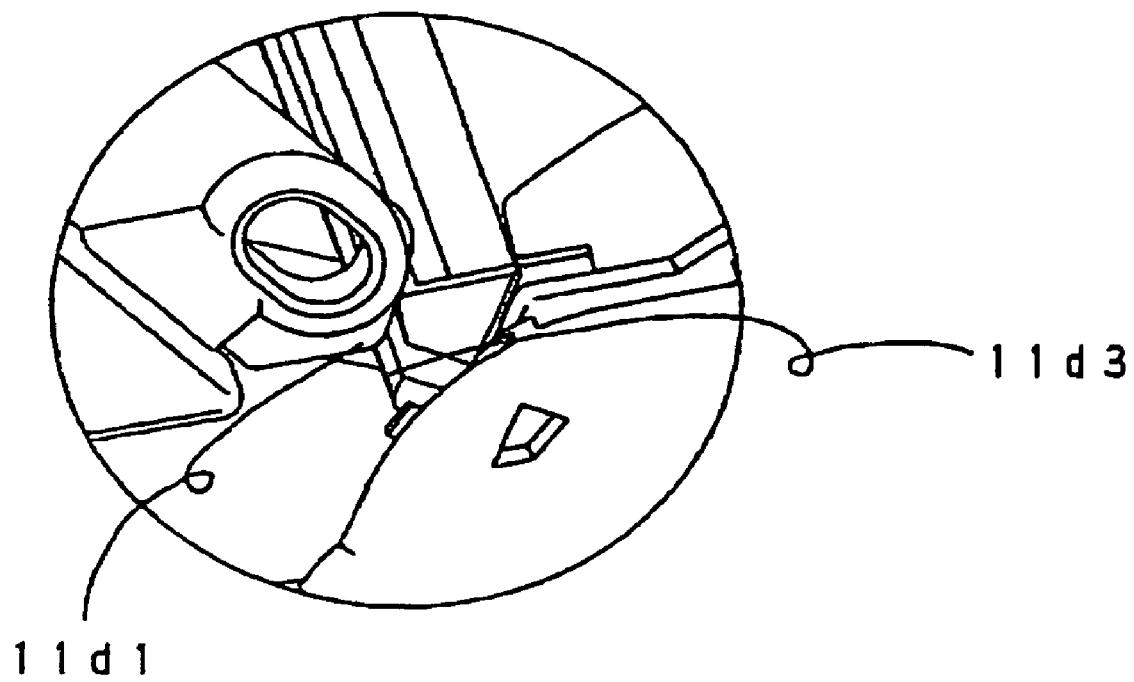
FIG. 25 is a magnified partial perspective view showing the state of abutment between a projection of the cleaning frame and an abutment surface according to the embodiment of the invention.

A method of supplying the cleaning frame 11d in the assembly process of the cartridge B will be described below with reference to FIGS. 22 through 25. FIG. 22 is a front view showing the state in which the cleaning frame 11d is placed on a guide rail, FIGS. 23 and 24 are perspective views showing the state in which a plurality of cleaning frame 11d are placed on the guide rail, and FIG. 25 is a magnified partial perspective view showing the state of abutment between a projection of the cleaning frame 11d and an abutment surface.

The cleaning frame 11d which is a part constituting the cartridge B is placed on a guide rail 42 in the part supplying station in the assembly factory.

The guide rail 42 has a concave shape, and its surfaces are formed by good slip material, for example POM.

The cleaning frame 11d is placed on the guide rail 42 in such a manner that one side on which to incorporate the photosensitive drum 7, the charging roller 8 and the cleaning blade 11a faces the guide rail 42. The inside surface of each of support portions 11d4 and 11d5 of the respective roller bearings 8a and 8b of the charging roller 8 of the cleaning frame 11d has a dimensional relationship which produces a predetermined amount of looseness with respect to the opposing one of the outside surfaces of the concave portion of the guide rail 42.

First of all, the first cleaning frame 11d is placed on the guide rail 42. Then, the next cleaning frame 11d is placed in the same attitude as the first one, and the cleaning frames 11d are moved in the direction of the arrows shown in FIG. 23. Incidentally, the movement of the cleaning frames 11d may be performed with the moving arm 50 (refer to FIG. 32) which will be described later, or by the manual operation of a worker.

Owing to this movement, as shown in FIG. 25, a projection 11d1 provided on the first cleaning frame 11d as an abutment portion and an abutment surface 11d3 which is provided on the next cleaning frame 11d as a receiving portion are brought into abutment with each other.

In addition, on the side of the cleaning frame 11d that is longitudinally opposite to the projection 11d1, a projection 111d2 and an abutment surface (not shown) are brought into abutment with each other. Then, each of the cleaning frames 11d is moved along the guide rail 42 by a distance equivalent to one cleaning frame. When the third cleaning frame 11d (as well as the following ones) is supplied, the cleaning frames 11d are similarly moved. Accordingly, the cleaning frames 11d can be arranged in a line in the same attitude and moved from the supplying station to the position of the assembly station.

According to this part supplying method, it is not necessary to place parts into individual conveying containers for moving the parts, arrange the conveying containers in a line, and convey the parts to the assembly station.

In the case where the cleaning frame 11d is placed on the guide rail 42, portions, such as the projections 11d1 and 11d2 and the abutment surface 11d3, which are brought into abutment with other portions during the movement of the cleaning frame 11d are disposed at locations separate from any important portion of the part. Accordingly, it is possible to convey the part while protecting any important portion required to have dimensional precision against damage due to contact between adjacent parts during the movement of the part.

More specifically, the projections 11d1 and 11d2 and the abutment surface 11d3 and the like are provided in portions of the cleaning frame 11d which differ from the surface to oppose the removed toner accommodating portion 11c. Accordingly, during the movement of the cleaning frame 11d, it is possible to convey the cleaning frame 11d without damaging or deforming any portion other than its abutment portions, for example, portions required to have dimensional precision, such as the side on which important components of the cartridge B, such as the photosensitive drum 7, the charging roller 8 and the cleaning blade 11a, are incorporated.

Figure 32:
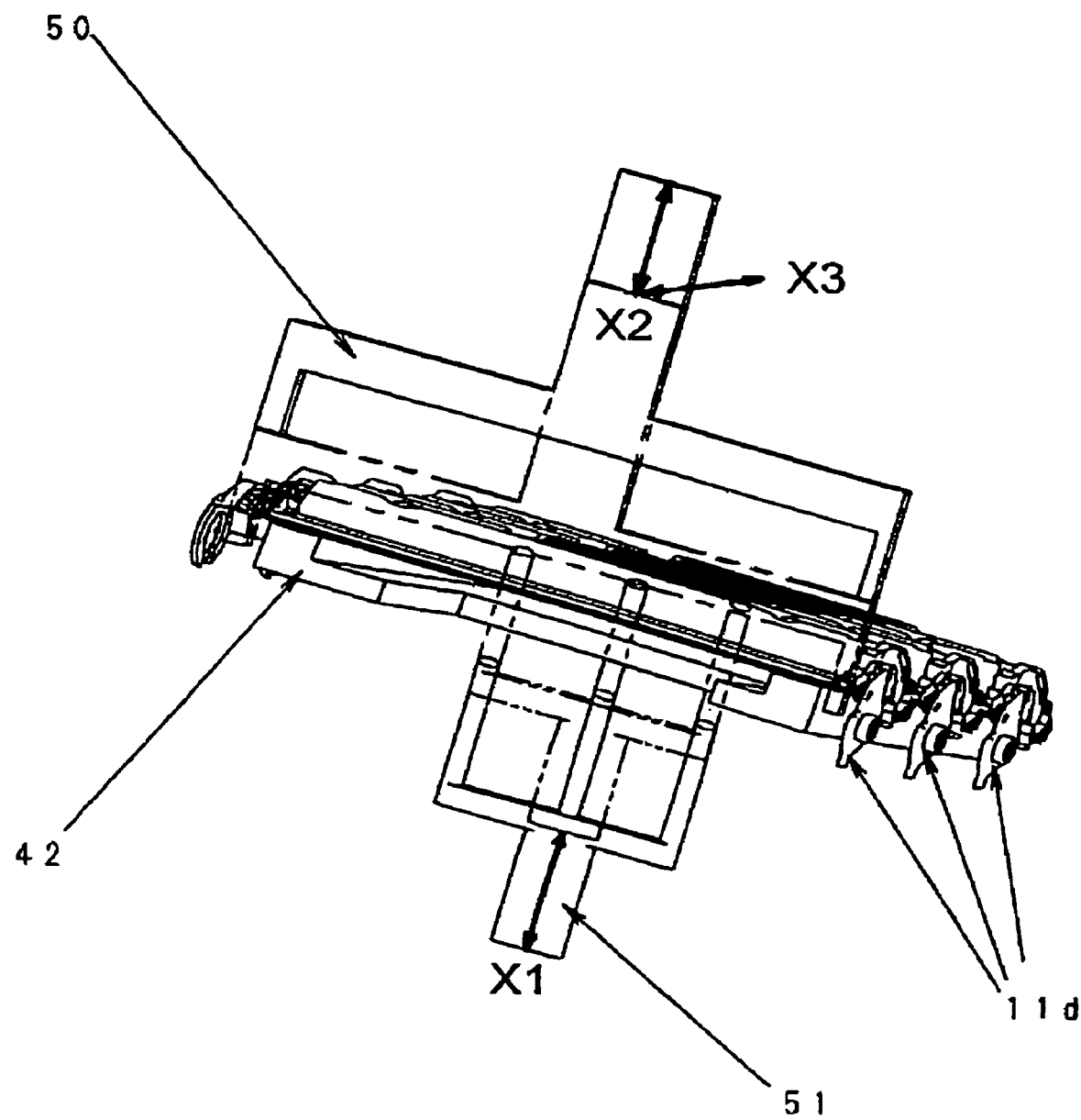
FIG. 32 is a schematic perspective view aiding in explaining the manner of supplying the cleaning frames according to the embodiment of the invention to the guide rail and moving the supplied cleaning frames.

A more specific example of the above-described part supplying method will be described below with reference to FIG. 32. FIG. 32 is a schematic perspective view aiding in explaining the manner of supplying the cleaning frames 11d to the guide rail 42 and moving the supplied cleaning frames 11d.

As shown in FIG. 32, at the start position of an assembly line, the cleaning frame 11d is supplied by air suction with an arm portion 51 of a robot for performing extraction from an injection molding machine (not shown) (S1).

When the cleaning frame 11d is placed one by one on the guide rail 42 in the same attitude (S2) by the arm portion 51, the suction air of the arm portion 51 stops, and the arm moves in the direction of an arrow X1 away from the cleaning frame 11d (S3).

After that, a moving arm 50 moves down in the direction of an arrow X2 (S4), and pushes the cleaning frame 11d in the direction of an arrow X3 to slidingly move the cleaning frame 11d on the guide rail 42 (S 5).

The shape of the moving arm 50 is set so that the portion of the cleaning frame 11d that does not affect the function thereof is selected as the position of contact between the cleaning frame 11d and the moving arm 50. When the second cleaning frame 11d is supplied onto the guide rail 42 by the arm portion 51 from the injection molding machine, the second cleaning frame 11d is moved similarly to the first cleaning frame 11d.

It is to be noted that this supplying method can be similarly applied to the toner developing frame 10/1, the lid member 10/2 and other constituent parts of the process cartridge B.

According to this construction, during the movement of the cleaning frame 11d, it is possible to convey the cleaning frame 11d without damaging or deforming any portion other than its abutment portions, for example, portions required to have dimensional precision, such as the side on which important components of the cartridge B, such as the photosensitive drum 7, the charging roller 8 and the cleaning blade 11a, are incorporated.

In terms of balance during movement, it is most preferable that the above-described frames such as the toner developing frames 10f1, the lid members 10f2 or the cleaning frames 11d be arranged in a line so that their respective longitudinal directions are juxtaposed.

As shown in FIG. 23, each of the projections 11d1 and 11d2 according to this embodiment is formed to have an elliptic cross-sectional shape. However, the projections 11d1 and 11d2 are not limited to such a shape and may also be formed as round bosses or deformed projections.

In addition, if the following relationship is satisfied, i.e., surfaces to which two projections are respectively opposed when parts are arranged in a line are separate from the respective projections by the same distance and the distance between each of the two projections and the opposed one of the surfaces is smallest of all distances between the parts in the direction of arrangement thereof, the two projections and the respective opposed surfaces can be brought into abutment with each other as described above. In addition, the number of projections is not limited to two, and as long as a plurality of projections are used, it is possible to achieve a similar advantage.

It is general practice to produce the toner developing frame 10f1, the lid member 10f2 and the cleaning frame 11d by injection molding with a resin such as polystrene (hereinafter PS) or acrylonitrile butadiene styrene (ABS). It has also been recent practice to dispose an injection molding machine at the leading position of an assembly line of the cartridge B for the purpose of automatic production. In this case, if the toner developing frame 10f1, the lid member 10f2 and the cleaning frame 11d are supplied directly from the injection molding machine without the use of a part supplying station, when the individual parts are removed from the guide rails at the respective assembly stations, each of the removed parts can be received in a constant attitude. This feature is useful for the designing of automatic production facilities.

Figure 26:
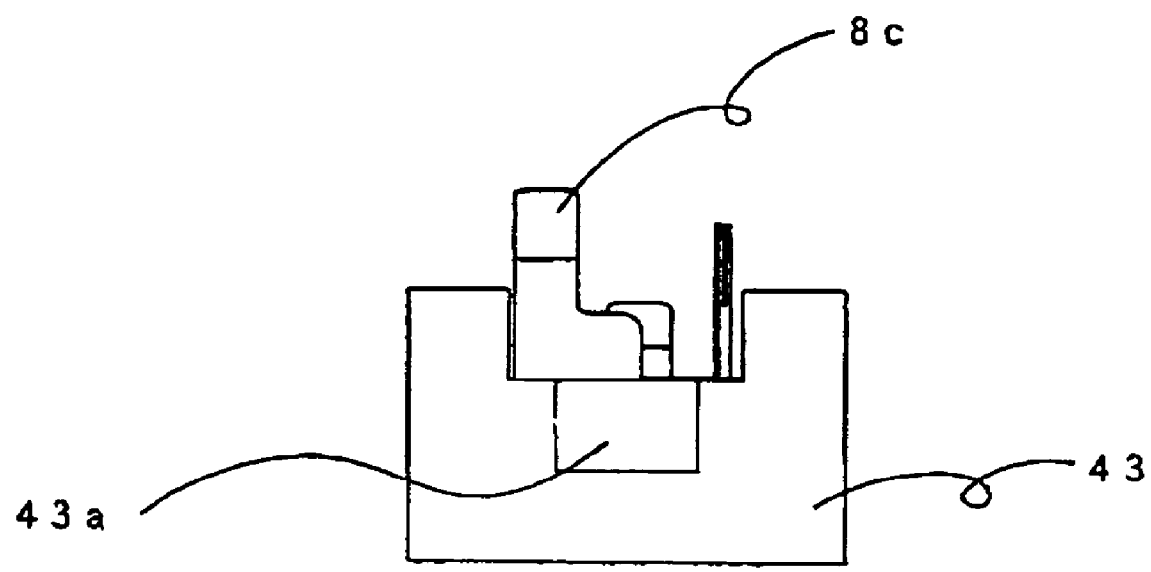
FIG. 26 is a front view showing the state in which an electrode according to the embodiment of the invention is placed on a guide rail.
Figure 27:
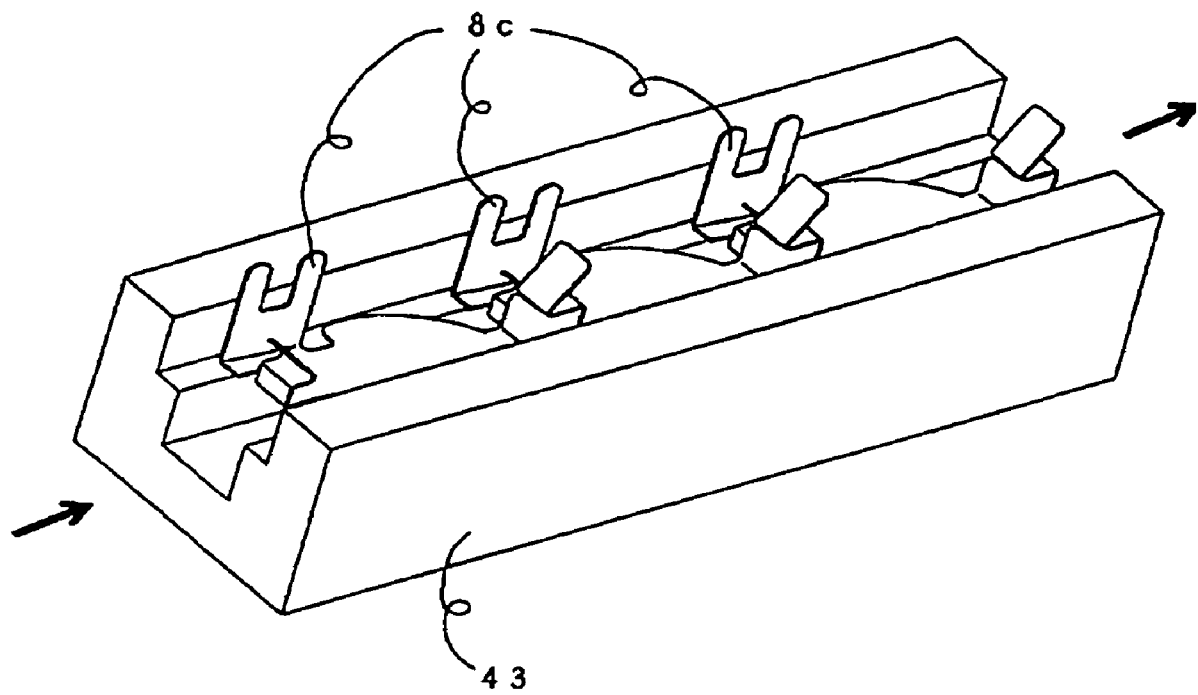
FIG. 27 is a perspective view showing the state in which a plurality of electrodes according to the embodiment of the invention are placed on the guide rail.
Figure 28:
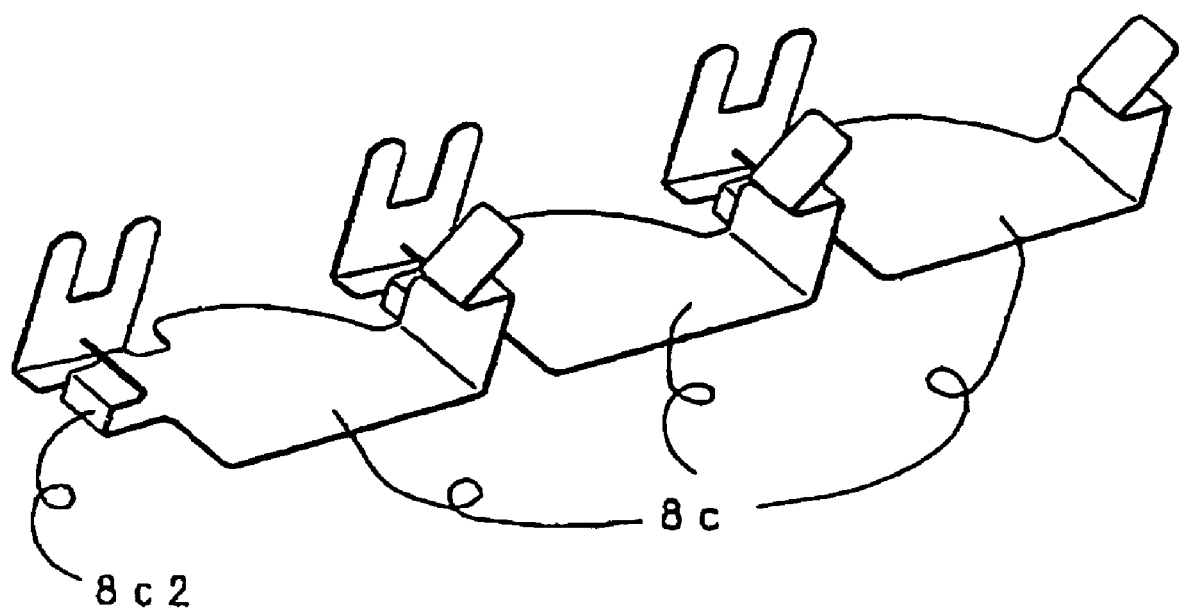
FIG. 28 is a perspective view showing only the plurality of electrodes placed on the guide rail.
Figure 29:
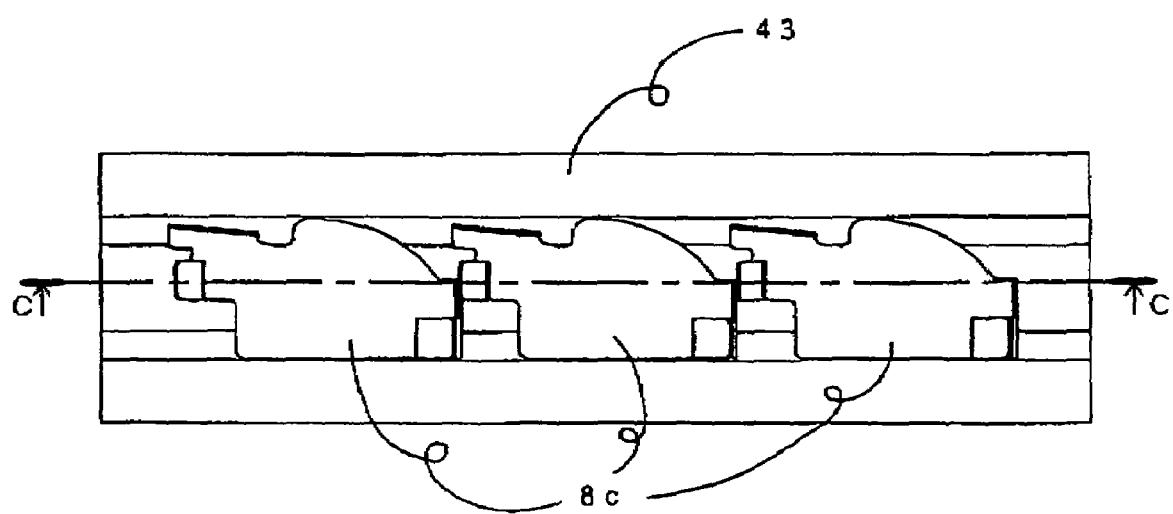
FIG. 29 is a top plan view showing the state in which the electrodes according to the embodiment of the invention are placed on the guide rail.
Figure 30:
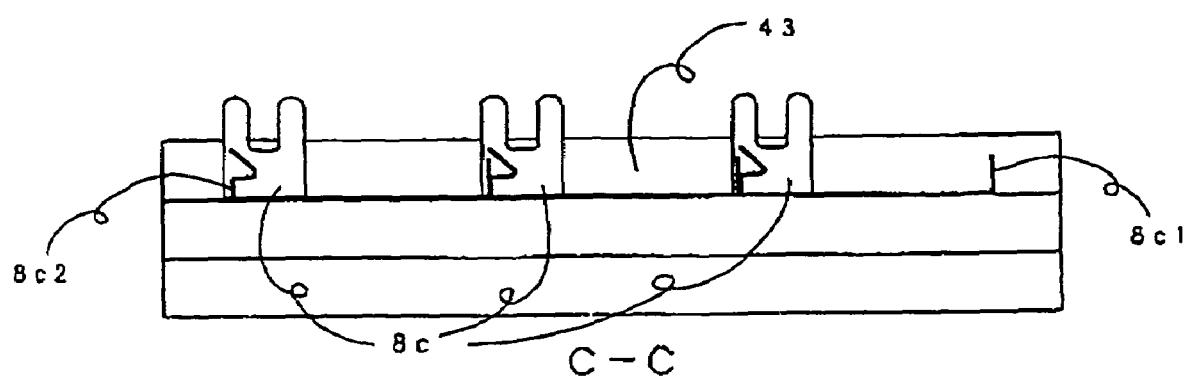
FIG. 30 is a cross-sectional view taken along line C—C of FIG. 29, showing the state in which the electrodes according to the embodiment of the invention are placed on the guide rail.
Figure 31:
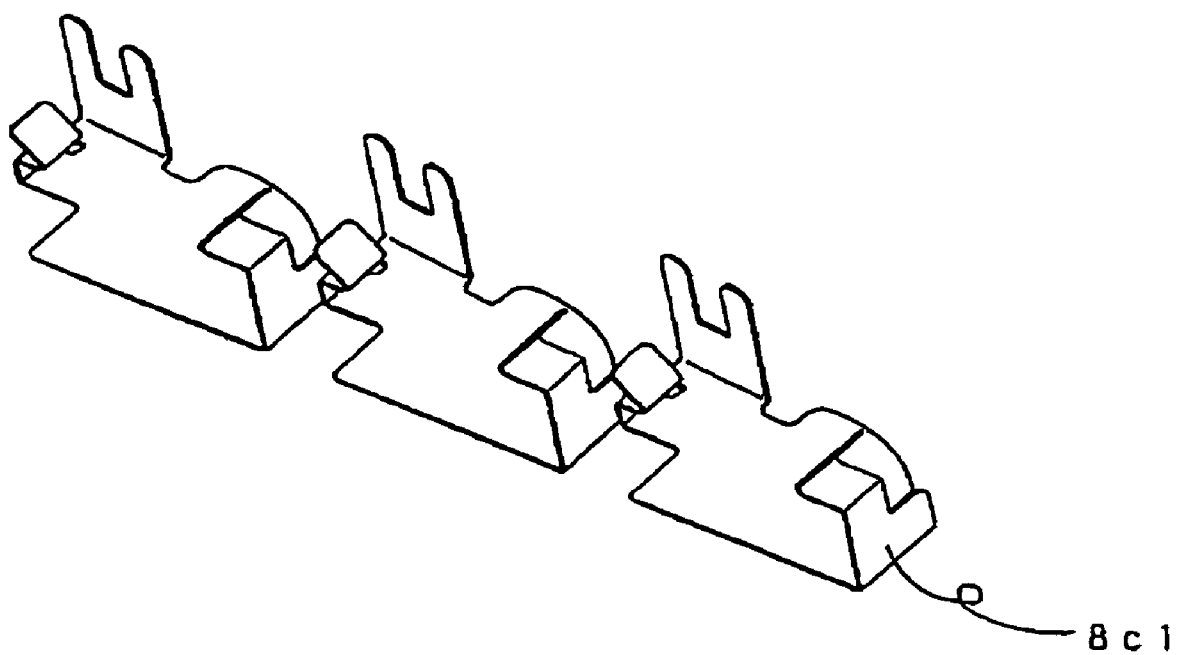
FIG. 31 is a perspective view showing only the plurality of electrodes placed on the guide rail.

A method of supplying the electrode 8c in the assembly process of the cartridge B will be described below with reference to FIGS. 26 to 31. FIG. 26 is a front view showing the state in which the electrode 8C is placed on a guide rail, FIG. 27 is a perspective view showing the state in which a plurality of electrodes 8C are placed on the guide rail, FIGS. 28 and 31 are perspective views showing only the plurality of electrodes 8c placed on the guide rail, FIG. 29 is a top plan view showing the state in which the plurality of electrodes 8C are placed on the guide rail, and FIG. 30 is a cross-sectional view taken along line C—C of FIG. 29.

The electrode 8c which constitutes part of the cartridge B is placed on a guide rail 43 in the part supplying station in the assembly factory.

The electrode 8c has a first bend 8c1, a second bend 8c2 and a third bend all of which are bent approximately perpendicularly to the surface of the electrode 8c that comes into abutment with a contact of the main body of the apparatus A. The electrode 8c is connected to the cleaning frame 11d by the first bend 8c1 and the second bend 8c2. The third bend serves as an electrical conduction path to the bearing 8b for supplying electricity. The first bend 8c1 and the second bend 8c2 have parallel portions, and their parallel surfaces are perpendicular to the direction of movement of the electrode 8c on the guide rail 43 (the direction of the arrows shown in FIG. 27). In addition, a punching flash which occurs at the time of punching the shape of the electrode 8c is formed on the inside does not come into contact the guide rail 43, so that the electrode 8c is prevented from failing to move by being caught during the movement thereof.

The guide rail 43 has a concave shape, and its surfaces are formed by good slip material, for example POM.

The electrode 8c is placed with its surface to come into abutment with the contact of the main body of the apparatus A facing the guide rail 43. The width of the concave portion of the guide rail 43 is defined so that the guide rail 43 has a predetermined amount of looseness with respect to the external shape of electrode 8c in the moving direction thereof. Furthermore, the guide rail 43 is provided with a concave portion 43a so that the portion of the electrode 8c that comes into contact with the contact of the main body of the apparatus A does not come into contact with the guide rail 43.

First of all, the first electrode 8c is placed on the guide rail 43. Then, when the next electrode 8c is placed in the same attitude as the first one, the electrodes 8c are moved in the direction of the arrows shown in FIG. 27.

At this time, the outside surface of the first bend 8c1 of the first electrode 8c and the parallel surface of the outside surface of the second bend 8c2 of the next electrode 8c, are superposed on each other as viewed in the direction of arrangement of the electrodes 8c. In addition, the first and second electrodes 8c come into abutment with each other because the distance between these sheet metals is the smallest in the direction of arrangement of the electrodes 8c, whereby each of the first and second electrodes 8c can be moved in the moving direction by a distance equivalent to the size of one electrode. When a third electrode 8c (as well as the following ones) is supplied, the electrodes 8c are similarly moved. Accordingly, the electrodes 8c can be arranged in a line in the same attitude and moved from the supplying station to the position of the assembly station.

According to this part supplying method, it is not necessary to place parts into individual conveying containers for moving the parts, arrange the conveying containers in a line, and convey the parts to the assembly station.

The first bend 8c1 and the second bend 8c2 which are brought into abutment with the guide rail 43 in the case where the electrode 8c is placed thereon are provided so that the contact portion for contact with the main body of the apparatus A that is an important portion of the electrode 8c does not come into contact with the guide rail 43. Accordingly, it is possible to convey the part while protecting the contact portion against damage due to contact between adjacent parts during the movement of the part.

In the description of this embodiment, reference has been made to the four kinds of parts, and any of the four kinds of parts can be also be moved in the opposite direction to the above-described direction of the arrows shown in the corresponding figure. The direction of movement may be selected according to the design specification of an assembly facility. In addition, the above-described projections and abutment surfaces are not limited to any of the above-described shapes, and can be set to any shape that realizes similar functions and does not affect the function of the cartridge. It goes without saying that the above-described construction can be applied to not only the above-described four kinds of parts but also other cartridge parts.

As described above, in accordance with cartridge parts and supplying methods therefor according to this embodiment, it is not necessary to perform the operation of placing parts into individual conveying containers, arranging the conveying containers in a line, and conveying the parts to the assembly station. Accordingly, it is possible to improve work efficiency and productivity in assembly.

In addition, although the cartridge used in the above-described embodiment is of the type which forms monochromatic images, the invention can also be suitably applied to a cartridge of the type which is provided with a plurality of developing means and forms images in a plurality of colors (for example, a two-color image, a three-color image or a full-color image).

The kind of electrophotographic photosensitive member is not limited to the above-described photosensitive drum, and includes the following examples. A photoconductor is used as the photosensitive member, and the photoconductor includes, for example, amorphous silicon, amorphous selenium, zinc oxide, titanium oxide and organic photoconductors (OPC).

The shape in which the photosensitive member is to be incorporated is, for example, a drum- or belt-like shape. For example, a drum type of photosensitive member is formed by covering a cylinder of aluminum alloy or the like with a photoconductor by evaporation or coating.

As a developing method, it is possible to use various known developing methods such as a two-component magnetic brush developing method, a cascade developing method, a touch-down developing method and a cloud developing method.

In the above-described embodiment, a so-called contact charging method is used as the construction of the charging means, but as a matter of course, it is possible to use another construction in which tungsten wire which has heretofore been used is surrounded by metal shields such as aluminum on three sides so that positive or negative ions generated by applying a high voltage to the tungsten wire are made to move to the surface of the photosensitive drum to uniformly charge the surface of the same.

The charging means is not limited to the above-described roller type, and may also be of another type such as a blade (charging blade) type, a pad type, a block type, a rod type or a wire type.

As a method of cleaning toner remaining on the photosensitive drum, a blade, a fur brush, a magnetic brush or the like may be used to constitute cleaning means.

The above-described process cartridge is provided with, for example, an electrophotographic photosensitive member and at least one process means. Accordingly, the form of the process cartridge is not limited to the above-described one, and it is also possible to use other forms such as a form in which an electrophotographic photosensitive member and developing means which serves as process means are integrated into a cartridge to be removably fitted into a main body of an apparatus, and a form in which an electrophotographic photosensitive member, developing means which serves as process means, and either of charging means and cleaning means are combined and integrated into a cartridge to be removably fitted into a main body of an apparatus.

Namely, the above-described process cartridge is of the type in which at least developing means and an electrophotographic photosensitive member are integrated into a cartridge to be removably fitted into the main body of the image forming apparatus. This process cartridge can be removably fitted into the main body of the apparatus by a user himself/herself. Accordingly, the user can perform maintenance of the main body of the apparatus for himself/herself.

In the above description of the embodiment, the laser beam printer has been referred to as the electrophotographic image forming apparatus by way of example, but the invention need not be limited to the laser beam printer. As a matter of course, the invention can be applied to an electrophotographic image forming apparatus such as an electrophotographic copying machine, an electrophotographic printer such as an LED printer, a facsimile machine, a word processor, or a multifunction machine (such as a multifunction printer).

The above-described embodiment is as follows.

A part which is designed so that a plurality of parts each identical to the part are arranged in the same attitude in parallel with a part moving direction on a guide (40, 41, 42) for supplying the part to a predetermined position, includes:

a plurality of abutment portions (for example, the projections 10/5 and 10/6) for pushing a plurality of receiving portions (for example, the abutment surface 10/7) provided on a preceding part placed on the guide (40, 41, 42), while maintaining an attitude of the preceding part; and a plurality of receiving portions (the abutment surface 10/7) to be pushed by a plurality of projections (10/5 and 10/6) provided on a succeeding part placed on the guide, the abutment portions (the projections 10/5 and 10/6) and the receiving portions (the abutment surface 10/7) being provided in an area of the part, which area is selected to avoid an area required to have dimensional precision.

The part further includes positioning restricting portions (the projections 10/1a and 10/1b) for restricting a position of the part on the guide (40) with respect to a direction perpendicular to the part moving direction.

According to this construction, it is possible to prevent the attitude from varying with the movement of the part.

A length along the part moving direction from each of the plurality of abutment portions to a corresponding one of the plurality of receiving portions is substantially the same and is the largest of all lengths of the part along the part moving direction.

According to this construction, even if the part placed on the guide pushes the preceding part, the preceding part can move without rotating.

The abutment portions come into abutment with the respective receiving portions to restrict a position of the preceding part relative to a direction perpendicular to the part moving direction.

According to this construction, when the part placed on the guide pushes the preceding part, the part can adjust its mutual positional relationship to the preceding part relative to the direction perpendicular to the part moving direction.

The plurality of abutment portions (for example, the projections 10/5 and 10/6) and the receiving portions (for example, the abutment surface 10/7) are provided at both ends across the center of a width perpendicular to the part moving direction.

According to this construction, since the plurality of abutment portions are provided at both ends, the preceding part can be moved without being rotated.

Each of the abutment portions has a convex shape (for example, the projections 10/5 and 10/6).

Each of the receiving portions has a concave shape.

According to this construction, since the respective convex abutment portions are fitted into the concave receiving portions, when the part placed on the guide pushes the preceding part, it is possible to correct their mutual positional relationship relative to a direction perpendicular to the part moving direction.

The part is a part (the cleaning frame 11d) which supports an electrophotographic photosensitive member (the photosensitive drum 7) and constitutes a process cartridge (B).

The part is a part (the cleaning frame 11d) which supports a bearing of a charging member (the charging roller 8) for supporting an electrophotographic photosensitive member (7) and constitutes a process cartridge (B).

The part is a part (the cleaning frame 11d) which supports a cleaning member (for example, the cleaning blade 11a) and constitutes a process cartridge (B).

The part is a part (the toner developing frame 10/1) which contains toner and constitutes a process cartridge (B).

The toner is undeveloped toner.

A part which is designed so that a plurality of parts each identical to the part are arranged in the same attitude in parallel with a part moving direction on a guide (43) in which a groove for supplying a sheet-metal-like part to a predetermined position is provided, includes:

a first bend (the first bend 8c1) for pushing a bend (the second bend 8c2) which is provided on a preceding part placed in the groove (the concave portion 43a) and has a surface perpendicular to the part moving direction; and a second bend (the second bend 8c2) to be pushed by a bend (the first bend 8c1) which is provided on a succeeding part placed in the groove and has a surface perpendicular to the part moving direction, the first bend (8c1) and the second bend (8c2) being provided in an area selected to avoid an area (the third bend) through which the part comes into contact with another electricity supplying member.

A length along the part moving direction from the first bend (8c1) to the corresponding second bend (8c2) is the largest of all lengths of the part along the part moving direction.

The part constitutes part of an electricity supplying path.

The part constitutes part of an electricity supplying path to a charging member (8) for electrically charging an electrophotographic photosensitive member (7).

A part supplying method for supplying a part to a predetermined position, includes:

a step of placing a part on a guide in the same attitude as a preceding part on the guide (S2); and a step of moving the preceding part on the guide by pushing a plurality of receiving portions provided on the preceding part placed on the guide, in such a manner that an attitude of the preceding part is maintained, by means of a plurality of abutment portions provided on the placed part (S5).

A part supplying method for supplying a part to a predetermined position, includes:

a step of taking out a part by retaining the part at a portion thereof which does not affect functions of the part (S1);

a step of placing the retained part on a guide in the same attitude as a preceding part on the guide (S2); and a step of moving the preceding part on the guide by pushing a plurality of receiving portions provided on the preceding part placed on the guide, in such a manner that the attitude of the preceding part is maintained, by means of a plurality of abutment portions provided on the placed part (S5).

While the invention has been described with reference to the structure disclosed herein, it is not confined to the details set forth and this application is intended to cover such modifications or changes as may come within the purposes of the improvements or the scope of the following claims.

As is apparent from the foregoing description, according to the invention, it is possible to move a part in a part arranging direction without changing the attitude of the part. In addition, it is possible to supply the part to an assembly facility without causing damage to the part.

What is claimed is:

1. A part for being arranged with a plurality of parts each identical to said part with the same attitude in parallel with a part moving direction on a guide for supplying the part to a predetermined position, wherein the plurality of identical parts include a preceding part preceding said part on the guide and a succeeding part, succeeding said part on the guide, said part comprising:

a plurality of abutment portions configured and positioned to push a plurality of receiving portions provided on the preceding part placed on the guide, while maintaining the attitude of the preceding part, wherein each of said abutment portions has a convex shape; and a plurality of receiving portions to be pushed by a plurality of projections provided on the succeeding part placed on the guide, the plurality of abutment portions and the plurality of receiving portions being provided in an area of said part different from an area of said part required to have dimensional precision.

2. A part, for being arranged with a plurality of parts each identical to said part with the same attitude in parallel with a part moving direction on a guide for supplying the part to a predetermined position, wherein the plurality of identical parts include a preceding part preceding said part on the guide and a succeeding part, succeeding said part on the guide, said part comprising:

a plurality of abutment portions configured and positioned to push a plurality of receiving portions provided on the preceding part placed on the guide, while maintaining the attitude of the preceding part; and a plurality of receiving portions to be pushed by a plurality of projections provided on the succeeding part placed on the guide, wherein each of said receiving portions has a concave shape, the plurality of abutment portions and the plurality of receiving portions being provided in an area of said part different from an area of said part required to have dimensional precision.

3. A part according to claim 1 or 2, further comprising positioning restricting portions configured and positioned to restrict a position of said part on the guide with respect to a direction perpendicular to the part moving direction.

4. A part according to claim 1 or 2, wherein the length along the part moving direction from each of said plurality of abutment portions of said part to a corresponding one of said plurality of receiving portions of said part is substantially the same and is the largest of all lengths of said part along the part moving direction.

5. A part according to claim 1 or 2, wherein the plurality of abutment portions abut the respective receiving portions provided on the preceding part to restrict the position of the preceding part relative to a direction perpendicular to the part moving direction.

6. A part according to claim 1 or 2, wherein said plurality of abutment portions and said plurality of receiving portions are provided at both ends of said part across the center of the width of said part perpendicular to the part moving direction.

7. A part according to claim 1, wherein each of said receiving portions has a concave shape.

8. A part according to claim 1 or 2, wherein said part supports an electrophotographic photosensitive member and comprises a process cartridge.

9. A part according to claim 1 or 2, wherein said part supports a charging member and an electrophotographic photosensitive member and comprises a process cartridge.

10. A part according to claim 1 or 2, wherein said part supports a cleaning member and comprises a process cartridge.

11. A part according to claim 1 or 2, wherein said part contains toner and comprises a process cartridge.

* * * * *

UNITED STATES PATENT AND TRADEMARK OFFICE
CERTIFICATE OF CORRECTION

PATENT NO. : 7,200,349 B2  Page 1 of 1
APPLICATION NO. : 10/718790
DATED : April 3, 2007
INVENTOR(S) : Minoru Sato et al.

It is certified that error appears in the above-identified patent and that said Letters Patent is hereby corrected as shown below:

COLUMN 12:
Line 52, "10f" should read --10f8--.
Line 57, "10f" should read --10f8--.

COLUMN 13:
Line 63, "111d2" should read --11d2--.

COLUMN 14:
Line 50, "(S 5)" should read --(S5)--.

COLUMN 19:
Line 16, "the first" should begin a new paragraph.

Signed and Sealed this

Fifth Day of August, 2008

JON W. DUDAS
*Director of the United States Patent and Trademark Office*